(12) United States Patent
Zhao

(10) Patent No.: US 9,232,351 B1
(45) Date of Patent: Jan. 5, 2016

(54) LOCATION MANAGEMENT UTILIZING INITIAL POSITION FOR MOBILE NETWORKS

(71) Applicant: Macau University of Science and Technology, Macau (MO)

(72) Inventor: Qinglin Zhao, Macau (MO)

(73) Assignee: Macau University of Science and Technology, Macau (MO)

( * ) Notice: Subject to any disclaimer, the term of this patent is extended or adjusted under 35 U.S.C. 154(b) by 0 days.

(21) Appl. No.: 14/658,227

(22) Filed: Mar. 15, 2015

Related U.S. Application Data

(60) Provisional application No. 62/114,087, filed on Feb. 10, 2015.

(51) Int. Cl.
*H04W 24/00* (2009.01)
*H04W 4/02* (2009.01)
*H04W 64/00* (2009.01)
*H04W 68/00* (2009.01)

(52) U.S. Cl.
CPC .............. *H04W 4/02* (2013.01); *H04W 64/003* (2013.01); *H04W 68/005* (2013.01)

(58) Field of Classification Search
CPC combination set(s) only.
See application file for complete search history.

*Primary Examiner* — Tammy Pham
*Assistant Examiner* — Idowu O Osifade
(74) *Attorney, Agent, or Firm* — Ella Cheong Hong Kong; Sam T. Yip

(57) ABSTRACT

The present invention provides a method for updating a mobile terminal (MT) for a mobile communication network when the MT crosses a boundary of a first location-update (LA) area. The method comprises determining a second LA to be assigned to the MT for replacing the first LA. The second LA is characterized by a LA center and a LA size, both determined by optimizing them in a sense that a mean total location-management cost is minimized without restricting the LA center to be fixed at the initial position. The initial position is defined as the location where the MT performs a latest location update at the first LA before crossing the boundary. This invention also provides schemes of partitioning the second LA into sub-paging areas for use in paging the MT when a call arrives at the network, so as to minimize the paging cost while satisfying delay requirements.

19 Claims, 15 Drawing Sheets

$P_{rng}$ scheme $P_{wh}$ scheme

The impact of λ in Scenario 1.

The impact of k in Scenario 2.

The impact of h in Scenario 3.

The impact of [a, b] in Scenario 4.

The optimal x and R when k varies.

The mean update interval when k varies.

The total cost when k varies for different schemes.

Key:
(a): Location management scheme in 4G LTE
(b): the usual distance-based scheme
(c): the distance-based scheme disclosed in the present invention

LOCATION MANAGEMENT UTILIZING INITIAL POSITION FOR MOBILE NETWORKS

CROSS-REFERENCE TO RELATED APPLICATIONS

This application claims the benefit of U.S. Provisional Patent Application No. 62/114,087, filed on Feb. 10, 2015, which is herein incorporated by reference in its entirety.

FIELD OF THE INVENTION

The present invention generally relates to location management for a mobile communication network. In particular, the present invention relates to a method for tracking the location of a mobile device in the mobile communication network by utilizing the initial position of the mobile device.

BACKGROUND

List of Abbreviations Used Herein:
BS base station
CTRW continuous-time random walk
i.i.d. independently identically distributed
LA location-update area
LAL LA list
LCO LA center optimization
MT mobile terminal
SDF shortest distance first
List of References:

The following references are cited in the specification. Disclosures of these references are incorporated herein by reference in their entirety.

[1] I. F. Akyildiz, J. S. M. Ho, and Y. -B. Lin, "Movement-based location update and selective paging for PCS networks," *IEEE/ACM Transactions on Networking*, vol. 4, no.4, pp. 629-638, August 1996.

[2] X. Wang, X. Lei, P. Fan, R. Q. Hu, and S. Horng, "Cost Analysis of Movement-Based Location Management in PCS Networks: An Embedded Markov Chain Approach," *IEEE Transactions Vehicular Technology*, vol. 63, no.4, pp. 1886-1902, May 2014.

[3] C. Rose and R. Yates, "Minimizing the average cost of paging and registration: a timer-based method," *Wireless Networks*, vol. 2, no. 2, pp. 109-116, June 1996.

[4] K. Li, "Analysis of cost and quality of service of time-based dynamic mobility management in wireless networks," *Wireless Networks*, vol. 20, no. 2, pp. 261-288, February 2014.

[5] A. Bar-Noy, I. Kessler and M. Sidi, "Mobile users: to update or not to update?" *Wireless Networks*, vol. 1, no. 2, pp. 175-185, 1995.

[6] K. Li, "Analysis of Distance-Based Location Management in Wireless Communication Networks," *IEEE Transactions on Parallel and Distributed Systems*, vol. 24, no. 2, pp. 225-238, February 2013.

[7] B. Liang and Z. J. Haas, "Predictive distance-based mobility management for multidimensional PCS networks," *IEEE/ACM Transactions on Networking*, vol. 11, no. 5, pp.718-732, October 2003.

[8] R. Chen, S. Yuan, and J. Zhu, "A dynamic location management method of personal communication system," *E-Tech* 2004, pp. 1-9.

[9] C. K. Ng and H. W. Chan, "Enhanced Distance-Based Location Management of Mobile Communication Systems Using a Cell Coordinates Approach," *IEEE Transactions on Mobile Computing*, vol. 4, no. 1, pp. 41-55, January/February 2005.

[10] Y. Zhu, and V. C. M. Leung, "Derivation of moving distance distribution to enhance sequential paging in distance-based mobility management for PCS networks," *IEEE Transactions on Wireless Communications*, vol. 5, no. 11, pp. 3029-3033, November 2006.

[11] J. Zhou, H. Leong, Q. Lu, and K. Lee, "Optimizing Update Threshold for Distance-based Location Tracking Strategies in Moving Object Environments," *WOWMOM* 2007, pp. 1-8.

[12] Y. Zhu and V. C. M. Leung, "Optimization of Distance-Based Location Management for PCS Networks," *IEEE Transactions on Wireless Communications*, vol. 7, no. 9, pp. 3507-3516, September 2008.

[13] Q. L. Zhao, S. C. Liew and Y. Yu, "Location Update Cost of Distance-Based Scheme for PCS Networks with CTRW model," *IEEE Communications Letters*, vol. 13, no. 2, pp. 408-410, June 2009.

[14] R. M. Rodríguez-Dagnino, H. Takagi, "Application of renewal theory to call handover counting and dynamic location management in cellular mobile networks," *European Journal of Operational Research*, vol. 204, no. 1, pp. 1-13, 2010.

[15] U. Patel and B. N Gohil, "Cell Identity Assignment Techniques in Cellular Network: A Review," *3rd IEEE International Conference on Computer Science and Information Technology (ICCSIT)* 2011, pp. 594-596.

[16] B. Jarupan and E. Ekici, "Mobility management for efficient data delivery in infrastructure-to-vehicle networks," *Computer Communications*, vol. 35, no. 18, pp. 2274-2280, 2012.

[17] R. H. Liou, Y. B. Lin, and S. C. Tsai, "An Investigation on LTE Mobility Management," *IEEE Transactions on Mobile Computing*, vol. 12, no. 1, pp. 166-176, January 2013.

[18] R. H. Liou and Y. B. Lin, "Mobility Management with the Central-based Location Area Policy," *Computer Networks*, vo. 57, no. 4, pp. 847-857, March 2013.

[19] 3GPP, "General Packet Radio Service (GPRS) Enhancements for Evolved Universal Terrestrial Radio Access Network (E-UTRAN) Access," Technical Specification 3G TS 23.401, version 10.0.0 (2010-06), 2010.

[20] 3GPP, "Evolved Universal Terrestrial Radio Access (E-UTRA) and Evolved Universal Terrestrial Radio Access Network (E-UTRAN)," Technical Specification 3G TS 36.300, version 10.1.0 (2010-09), 2010.

[21] H. Fu, P. Lin, H. Yue, G. Huang, and C. Lee, "Group Mobility Management for Large-Scale Machine-to-Machine Mobile Networking," *IEEE Transactions on Vehicular Technology*, vol. 63, no. 3, pp. 1296-1305, 2014.

[22] S. Yang, Y. C. Lin, and Y. B. Lin, "Performance of Mobile Telecommunications Network with Overlapping Location Area Configuration," *IEEE Transactions on Vehicular Technology*, vol. 57, no. 2, pp. 1285-1292, March 2008.

[23] I. F. Akyildiz, Y. B. Lin, W. R. Lai, and R. J. Chen, "A new random walk model for PCS networks," *IEEE Journal on Selected Areas in Communications*, vol.18, no.7, pp.1254-1260, July 2000.

[24] T. X. Brown and S. Mohan, "Mobility Management for Personal Communication Systems," *IEEE Transactions on Vehicular Technology*, vol. 46, no. 2, pp. 269-278, May 1997.

[25] Z. Y. Lei and C. Rose, "Wireless subscriber mobility management using adaptive individual location areas for PCS systems" *in Proc. IEEE International Conference on Communications*, Atlanta, Georgia, 1998, pp.1390-1394.

[26] L. Aleman, E. Munoz-Rodriquez, D. Molina, "FBM mobility modeling for nomadic subscribers," *Proceedings of the 3rd IEEE Symposium Comp. Communications, ISCC*, Athens, Greece, June/July 1998.

[27] G. H. Weiss, *Aspects and applications of the random walk*, Amsterdam, Netherlands: North-Holland, 1994, pp. 95-99.

[28] E. Zauderer, *Partial differential equations of applied mathematics* (2nd edition), New York: Wiley, 1989.

[29] A. D. Polyanin, *Handbook of linear partial differential equations for engineers and scientists*, Chapman & Hall/CRC Press, Boca Raton, 2002.

[30] C. W. Gardiner, *Handbook of stochastic methods: for physics, chemistry and the natural sciences*, Berlin, New York: Springer, 2004.

[31] M. Hellebrandt, R. Mathar, and M. Scheibenbogen, "Estimating position and velocity of mobiles in a cellular radio network," *IEEE Transactions on Vehicular Technology*, vol. 46, no. 1, pp. 65-71, February 1997.

[32] B. C. Liu, K. H. Lin, J. C. Wu, "Analysis of hyperbolic and circular positioning algorithms using stationary signal-strength-difference measurements in wireless communications," *IEEE Transactions on Vehicular Technology*, vol. 55, no. 2, pp. 499-509, March 2006.

Description of Technical Problem to be Solved:

In mobile communication networks (such as 2G/3G/4G, mobile social networks and mobile cloud computing), the network is partitioned into a number of cells. For location management purposes, an LA consisting of a group of cells is defined as the tracking area of a MT. Location management consists of two complementary components: (i) location update wherein each MT periodically reports its location to the network, and (ii) terminal paging wherein the network pages the cells in an LA to identify the location of a MT upon a request. Location management consumes significant network resources, including wireless network bandwidth and computing time at network nodes.

A variety of schemes have been proposed to minimize the location management cost. Among them, three types of schemes are frequently referenced: movement-based scheme [1], [2], time-based scheme [3], [4], and distance-based scheme [5], [6]. The three schemes differ when a MT performs a location update, i.e. item (i) in the preceding paragraph. Specifically, for movement-based, time-based, and distance-based schemes, a MT performs a location update whenever the number of cells that have been crossed, the elapsed time, and the distance travelled, respectively, exceed a predefined threshold.

It has been shown in [5] that the distance-based scheme consumes the least signaling cost compared with the other two schemes. The distance-based scheme has attracted a great deal of attention [6]-[18] after that. Importantly, the location management scheme in 4G Long-Term Evolution (LTE) [19], [20] shares many essential characteristics with the distance-based scheme, as will be explained in Section G.1. Furthermore, [17] has pointed out the following: through a predefined LA configuration, the 4G LTE can partially implement the distance-based scheme with the shortest-distance-first (SDF) paging [1] for commercial operation; and [17] has evaluated the performance of the 4G LTE location management scheme using the distance-based model [22].

To date, despite substantial existing research results [6]-[18] on the optimization of the LA size, how to set the LA center has not been investigated to the inventor's knowledge.

There is a need in the art for determining the LA center and to utilize the result for location updating in mobile communication networks.

Description of Related Art Regarding Location Management Schemes:

In mobile communication networks, most existing research of relevance concentrates on three basic dynamic location management schemes, namely, movement-based, time-based, and distance-based schemes. The authors of [7] proposed a predictive scheme. The authors of [6], [8] and [12] analyzed the location management cost respectively when the cell residence time has a Gamma distribution, when the inter-call time has an exponential distribution and the cell residence time has an arbitrary distribution, and when the inter-call time and the cell residence time have arbitrary distributions. The authors of [10] derived the location distribution of a MT to reduce the paging cost. The authors of [11] optimized the distance threshold in moving object environments. The authors of [14] applied the renewal theory to minimize the location management cost. The authors of [9] and [15] investigated the implementation of the distance-based scheme [5] in which they respectively labeled each cell with the two-dimensional physical coordinate of the cell center or four-digits representing cell positions. The authors of [16] studied efficient data delivery between mobile vehicles and base stations using the distance-based scheme. The authors of [17] evaluated the performance of 4G LTE location management scheme using the distance-based model [22]. The authors of [18] made a simulation comparison between 4G LTE location management scheme and the usual distance-based scheme. Among these studies, only [17] and [18] theoretically analyzed the impact of the movement direction on the signaling cost under the one-dimensional discrete random-walk movement model, but they did not discuss the optimal LA design. Modeling the impact of the movement directionality is equivalent to characterizing the influence of LA center. In the inventor's previous work [13], the issue of minimizing the location-update cost of the distance-based scheme that optimizes the LA center was considered, under a one-dimensional CTRW movement model where a MT moves along a straight line with two movement directions toward left or right, and the length and the time of each movement are continuous.

Different from the previous works, the present work as disclosed herein in the present invention is targeted on the optimal LA design, with an emphasis on movement directionality. Furthermore, the present work as disclosed herein in the present invention substantially and significantly extends [13] to the more realistic and complicated two-dimensional case, investigates both the location-update cost and terminal-paging cost, and studies the joint optimization of LA center and LA size (i.e. the distance threshold).

Description of Related Art Regarding Movement Models:

There has been some previous works on studying the initial position. The authors of [26] investigated fractional Brownian motion with an initial position. However, the focus was on handoff management (addressing how to maintain an ongoing communication) rather than location management (addressing how to track an MT). The authors of [25] considered an adaptive LA with the initial position taken into account. However, the treatment was on one-dimensional Standard Brown Motion, and the update cost incurred by call arrivals was ignored.

Relative to the above works, a distinguishing feature of the present work as disclosed herein in the present invention is that we make a connection between measurable mobility-related physical parameters and the design of LAs.

SUMMARY OF THE INVENTION

In the present invention, it is provided with a method for updating a location of a MT for a mobile communication network when the MT crosses a boundary of a first LA assigned to the MT. This method is based on differentiating the LA center from an initial position of a MT, and optimizing the LA center in addition to optimizing the LA size. The method comprises determining, by one or more computers in the mobile communication network, a second LA to be assigned to the MT for replacing the first LA. The second LA is characterized by a LA center and a LA size. The LA center and the LA size are determined by numerically optimizing the LA center and the LA size in a sense that a mean total location-management cost predicted for the LA center and the LA size is minimized without restricting the LA center to be fixed at an initial position. The initial position of the MT is defined as a location where the MT performed a latest location update at the first LA before crossing the boundary.

Preferably, the mean total location-management cost is given by a sum of a mean location-update cost and mean terminal-paging cost.

The LA center and the LA size may be optimized by a local optimization algorithm.

The disclosed method for updating the location of the MT can be implemented in the mobile communication network as a first process for managing the location of the MT. In addition to incorporating the first process, a method for managing the MT's location can also include a second process of partitioning the second LA into a plurality of sub-paging areas for allowing the mobile communication network to select one or more such sub-paging areas to page the MT when a call arrives at the network.

The second process is preferably realizable as a $P_{ang}$ scheme, a $P_{arc}$ scheme, or a $P_{drf}$ scheme, where these three schemes are described in the disclosure hereinafter.

Other aspects of the present invention are disclosed as illustrated by the embodiments hereinafter.

BRIEF DESCRIPTION OF THE DRAWINGS

FIG. 1A is a usual LA design in which the center of the LA, O, is the initial position of the MT, X; and FIG. 1B is the LA design disclosed herein in which the center of the LA, O, is not necessarily the initial position of the MT, X.

FIG. 4A depicts the $P_{wh}$ scheme and FIG. 4B depicts the $P_{rng}$ scheme, the point O being the center of the LA.

FIG. 5A depicts the $P_{ang}$ scheme and FIG. 5B depicts the $P_{arc}$ scheme, the point X being the initial position of the MT.

DETAILED DESCRIPTION

Figure 1:
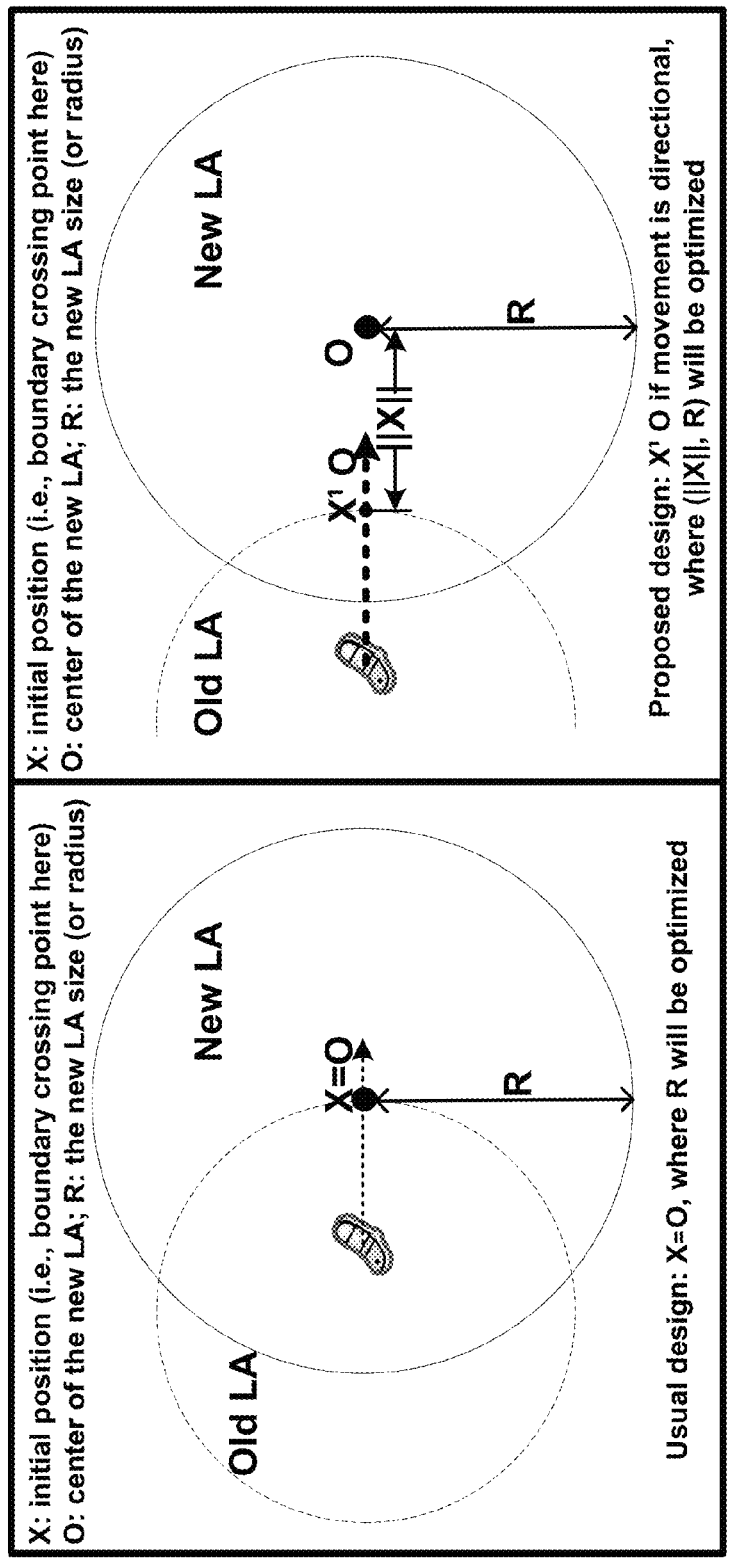
FIGS. 1A and 1B depict LA designs, where.

As used herein in the specification and the appended claims, the initial position of the MT in the new LA is defined as the location where the MT performs its latest location update at the current LA (see the position X in FIG. 1A).

In illustrating the present invention, we consider that any LA is a circular area. Nevertheless, the present invention is not limited to using only a circular area for the LA. The present invention is applicable to an irregular-shaped LA provided that this LA can be approximated by a circular area.

In the distance-based scheme considered in the present work, an MT initiates a location update whenever it crosses the boundary of its current LA. Upon each update, the LA center, O, and the LA size, R (i.e. radius or distance threshold), should be determined in order to construct the LA (i.e. the cells of the LA). In the usual LA design (see FIG. 1A), the center of the new LA, O, is set to be the MT's initial position X. Intuitively, when the movement is unbiased, such a setting can reduce the frequency of location updates; however, when the movement is biased (i.e. rather than moving in different directions with equal probability, certain directions have higher probabilities, say, from X to O in FIG. 1B), such a setting is suboptimal. Instead, setting the LA center O to be away from the initial position X in the preferred direction (O is on the right side of X in FIG. 1B) can delay the time that the MT moves out of the new LA.

Advantageously, we differentiate the LA center from the initial position of the MT, and investigate how to optimize the LA center O in addition to optimizing the LA size R. Based on this approach, a method for performing location update for a mobile communication network is obtained and is provided as an exemplary embodiment of the present invention.

The method is developed based on the theoretical development of Sections A-D. Section E elaborates implementation aspects of the location update method. By referencing to the location update method, the present invention is detailed in Section F.

A. System Assumptions and the CTRW Mobility Model

A.1 Mobile Communication Network Assumptions

The coverage area of a mobile communication network is a two-dimensional plane that is partitioned into a number of cells. Each cell has a BS that broadcasts its cell identity periodically. Multiple BSs are connected to a centralized LA management entity (such as the mobile switching center in 2G and the mobility management entity in 4G), where LA databases (such as the visitor location register in 2G) are maintained. The network and the MTs can exchange location information through radio links between BSs and MTs, to support distance-based location management.

In the distance-based scheme, a new LA (that consists of cells) for a MT is dynamically formed based on the traffic and mobility patterns of the MT. The MT is assumed to be able to estimate its own traffic pattern and movement parameters, such as the mean length, direction, and time for each movement. When boundary crossing occurs (e.g., when the MT finds that the received cell identity does not belong to its current LA) or when a call arrives, the MT performs a location update and transmits these estimated parameters to the LA management entity via the BS of the current cell. Upon receiving these parameter values, the LA management entity first calculates the LA center and size, and uses them to configure a new LA (i.e. the cells of the new LA), and then updates the new LA to the LA database, while it transfers the new LA information to the MT for the purpose of tracking. We assume that the movement pattern of a MT follows the CTRW mobility model. In the system under consideration, the LAs for different MTs may be different, depending on their movement and traffic patterns. In contrast, in the conventional 2G/3G architecture, each LA is predefined for all MTs and has a fixed boundary, while in 4G LTE, each LA is formed per MT but the LA size does not adapt to the movement and traffic patterns of each MT.

A.2 The Montroll-Weiss CTRW Mobility Model [27]

Before the CTRW model considered in the present invention is described, we elaborate advantages of using the CTRW model.

For distance-based location management, the design and analysis of location management schemes depend on a mobility model of MTs. In the present work, we adopt the popular two-dimensional CTRW model for three-fold advantages. First, the CTRW model can be used to capture the practical and fundamental movement characteristics of an MT. For example, the MT may move along a road on a specific direction until it comes to a junction point. At the junction point, the MT may change direction. The process is repeated indefinitely. Second, the CTRW model readily enables us to investigate the impact of mobility patterns and traffic characteristics on the location management cost and help to optimize the LA design. To capture this impact, the present work provides a comprehensive and general treatment which culminates in the mean location update interval theorem (see Theorem 1). Third, the CTRW model is more general: the widely used mobility models such as the classical discrete random walk model [17], [23], and continuous-time mobility models such as the Standard Brown Motion [24], [25], are only special cases of the CTRW model. In the discrete random walk model, the coverage of mobile communication networks is partitioned into many square or hexagon cells with the same size. A movement from one cell to another is defined as one displacement. The displacements are only between adjacent cells (as opposed to roads of varying lengths), limiting the number of displacement directions to four or six; furthermore, the displacement length and time are constant. Removing the constant constraints in the discrete random walk model, the Standard Brown-Motion model, however, assumes that the movement of an MT is completely arbitrary, without considering existence of realistic roads. These two models oversimplify the movement characteristics of a MT and fail to capture many practical and fundamental movement characteristics. The adopted CTRW model [27] retains the independently identically distributed (i.i.d.) property of displacements in the classical random walk model, but it extends the classical model by allowing the length and the time of each movement to be random, say, i.i.d. with an arbitrary probability distribution including an exponential distribution. Consequently, the CTRW model is not necessarily Markovian.

Figure 2:
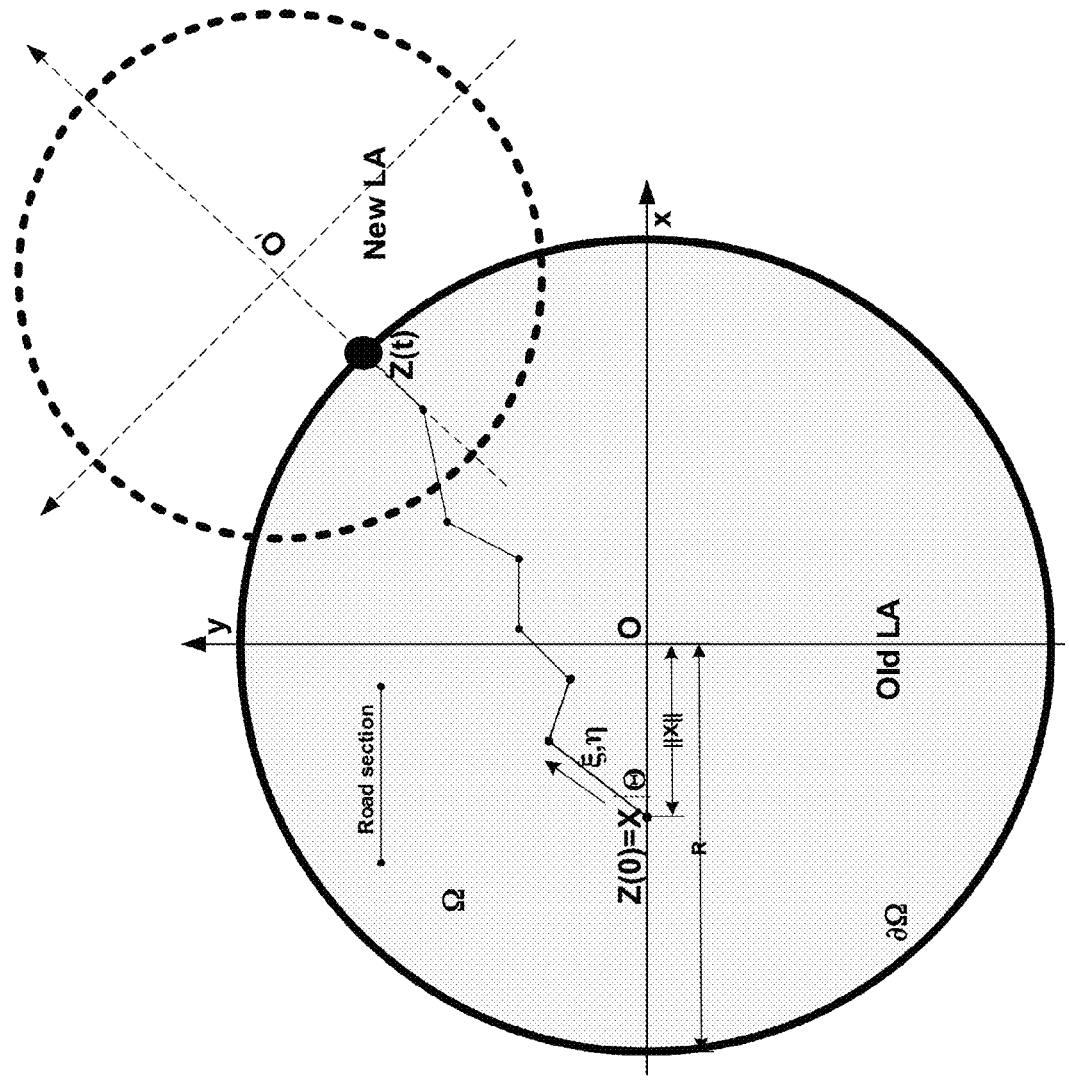
FIG. 2 depicts the Montroll-Weiss CTRW mobility model and the disclosed location update scheme for each MT in a two-dimensional plane.

The shaded area in FIG. 2 illustrates the two-dimensional CTRW model, where the MT's preferred movement direction is the positive direction of the x-axis. Assume that the MT is initially at X=(x, y) within the LA $\Omega$. The MT in the CTRW model moves along a straight line on a specific direction and once in a while it travels along another straight line on a new direction. The movement across a straight line segment (or a road section) is called one displacement. The length of the road section is called the displacement length, denoted by $\xi$. The angle between the road section and a reference direction is called the displacement direction, denoted by $\Theta$. The time expended in traveling across the entire road section is called the pausing time, denoted by $\eta$.

Let $\vec{\chi}$ be the displacement vector of each movement. According to the CTRW model, we have $\vec{\chi}=(\xi \cos \Theta, \xi \sin \Theta)$ and $(\vec{\chi}, \eta)$ completely describing one displacement of the MT. Since the CTRW model assumes that each displacement of the MT is i.i.d. with $(\vec{\chi}, \eta)$, the MT's movement process $\{Z(t), t \geq 0\}$ is completely determined by $(\vec{\chi}, \eta)$, where $Z(t)$ denotes the position of the MT at time t and $Z(0)=X$.

An important asymptotic property of the CTRW model: Let n(t) denote the number of the displacements made until time t. It has been proved and validated in [27] that after a large number of displacements, i.e. $n(t) \gg 1$, if $\vec{\chi}$ and $\eta$ have finite moments, then the MT's movement process $\{Z(t), t \geq 0\}$ can be approximated by a time-homogeneous diffusion process $\{Y(t), t \geq 0\}$ with a drift vector $\vec{\mu}$ (i.e. the vector of the mean speed for each displacement) and a diffusion coefficient matrix $\vec{\sigma}$ (i.e. the matrix of the variance of the speed for each displacement), where $Y(0)=Z(0)=X$; $\vec{\mu}$ and $\vec{\sigma}$ are given, respectively, as $$\vec{\mu} \triangleq (\mu_1, \mu_2) = \frac{E(\vec{\chi})}{E(\eta)}, \vec{\chi} = (\xi\cos\Theta, \xi\sin\Theta), \qquad (1)$$

$$\vec{\sigma} \triangleq \begin{pmatrix} \sigma_{11} & \sigma_{12} \\ \sigma_{21} & \sigma_{22} \end{pmatrix} = \frac{\text{Var}(\vec{\chi})E^2(\eta) + \text{Var}(\eta)E(\vec{\chi})E(\vec{\chi})^T}{E^3(\eta)}.$$

Here, by time-homogeneous, we mean that $\vec{\mu}$ and $\vec{\sigma}$ are independent of t. In (1), $E(\cdot)$, $\text{Var}(\cdot)$, and $(\cdot)^T$ denote the mean, the variance, and the transpose of $\cdot$, respectively. Note that when $\vec{\chi}$ and $\eta$ have finite moments, without being limited to particular distributions such as Poisson distribution, the movement process of the MT is of the asymptotic form of the diffusion process; if $\vec{\chi}$ or $\eta$ has an infinite moment, the asymptotic form of the movement process will be different. In addition, it has been pointed out and validated in [27], even for a moderate value of n(t), the diffusion approximation is fairly accurate already.

Built on the CTRW model, the present work employs three assumptions listed below to simplify the theoretical analysis.

A.3 The Assumption on the Displacement Length (Denoted as Assumption A1)

Let R denote the shortest distance between the boundary of LA and the origin. We assume the mean displacement length $E(\xi) \ll R$. Since $E(\xi) \ll R$ necessarily leads to $n(t) \gg 1$, the asymptotic property of the CTRW model, mentioned in (1), holds when the MT moves out of the LA. However, the randomness of the movement in the CTRW model implies that the MT may travel the same road section many times. Consequently, a moderate value of $R/E(\xi)$ (i.e. not necessarily a very large value) will possibly lead to a large n(t) already. As observed in FIG. 7C, even if $R/E(\xi)=8$, the diffusion approximation is already fairly accurate.

A.4 The Assumption on the Displacement Direction (Denoted as Assumption A2)

We assume that the MT has a preferred movement direction. Without loss of generality, we define the preferred direction (or the reference direction) to be in the positive direction of the x-axis. The preferred direction is preserved throughout the motion of the MT even though it may momentarily travel at an angle to the preferred direction because of the geographical layout of roads. That is, we do not consider the situation where the preferred direction is frequently changed. The angle $\Theta$ between the selected direction and the reference direction, has a probability density function, $f_\Theta(\theta; k)$, where k is a factor corresponding to the tendency to stay in the preferred direction. For a given k, we assume that $f_\Theta(\theta; k)$ is an even function and has the following properties:

$$f_\Theta(\theta;k) = f_\Theta(-\theta;k), \theta \in [-\pi,\pi] \text{ for a given } k, \quad (2)$$

$f_\Theta(\theta;k)$ is decreasing on $[0,\pi]$ for a given k, particulary, $$f_\Theta(\theta; k) = \begin{cases} 1/(2\pi), & k \to 0 \\ \delta(\theta), & k \to \infty \end{cases},$$

where $\delta(\cdot)$ is the one-dimensional delta function.

Figure 3:
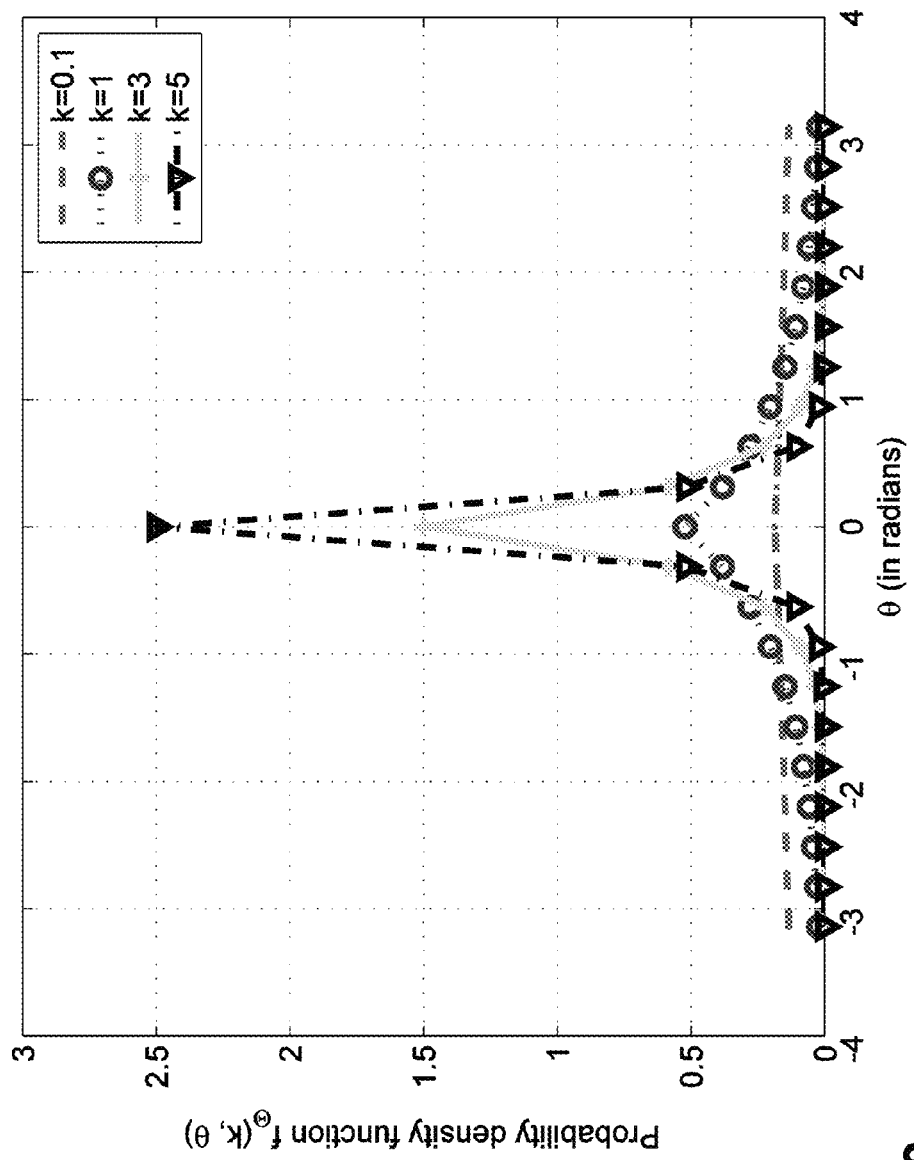
FIG. 3 depicts the probability density function, $f_\Theta(k;\theta)$.

In (2), the larger the k is, the stronger the tendency is. In the limit of k=0, a MT changes its direction of travel at an angle between 0° and 360° with a uniform probability with respect to the preferred direction. In the limit of k=∞, the MT moves along the preferred direction with probability 1. EQN. (3) gives an example of $f_\Theta(\theta; k)$ and FIG. 3 plots the corresponding probability density function $$f_\Theta(\theta; k) = \frac{ke^{-k|\theta|}}{2(1 - e^{-k\pi})}, 0 \le k \le \infty, -\pi \le \theta \le \pi. \quad (3)$$

A.5 The assumption on the LA (Denoted as Assumption A3)

In the present work, we assume that the LA $\Omega$ is a circular area with radius R. This assumption makes the performance analysis tractable.

B. The Disclosed Location Management Scheme

A location management scheme consists of the location update scheme, which defines how an MT notifies the network of its position, and the terminal-paging scheme, which defines how the system finds the called MT. The distance-based location management scheme is a per-MT scheme (that is, each MT is tracked based on its LA). Below, for a given preferred movement direction, we first describe the conventional scheme and then the disclosed LCO scheme.

B.1 A review of the Conventional Distance-Based Scheme

In the conventional scheme, the location update and terminal paging operations are as follows.

The location update occurs when the MT either crosses the boundary of its current LA or receives a call. Then a new LA will be constructed and updated to a network database, replacing the old LA. For the new LA, the LA center is set to be the MT's initial position (e.g., O=X in FIG. 1A).

The terminal paging is triggered when a call to the MT arrives at the network. Then the network will query the database to obtain the MT's LA and page the cells within the sub-paging areas of that LA. The partition of the LA into sub-paging areas is circularly symmetric with respect to the center of the LA, as shown in FIG. 4.

Figure 4B:
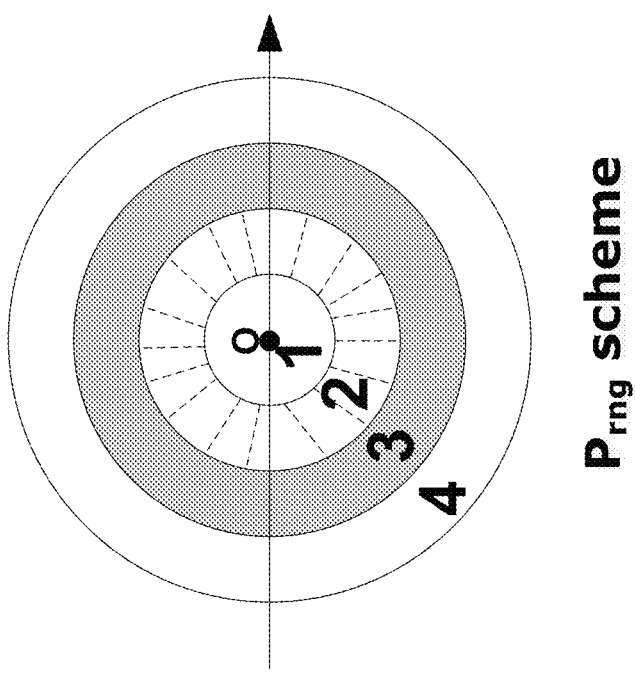
FIGS. 4A and 4B depict conventional paging schemes, where
Figure 4A:
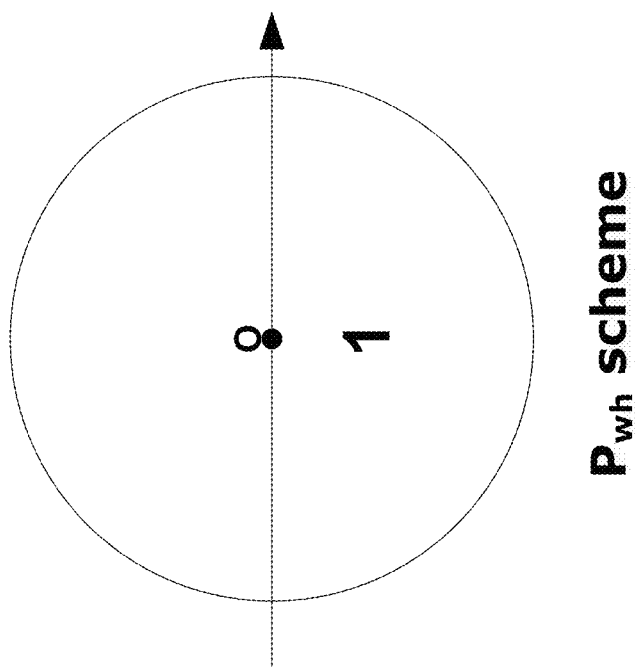
Figure 5B:
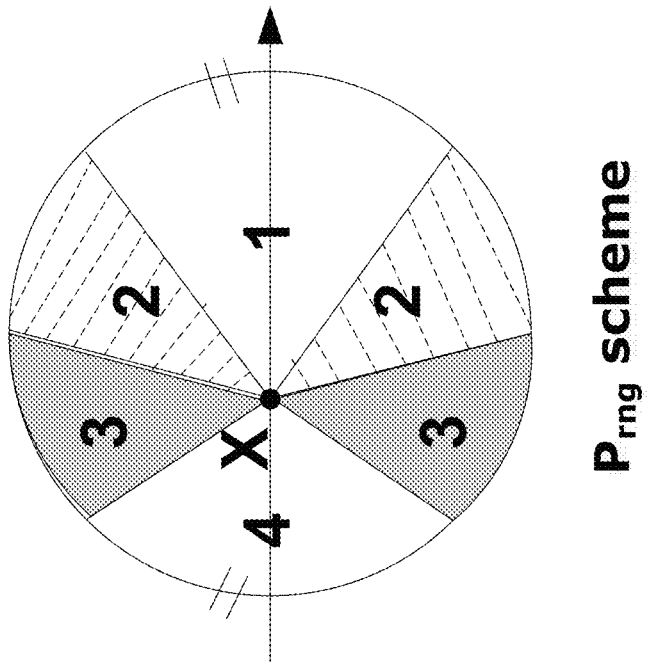
FIGS. 5A and 5B depict disclosed paging schemes, where
Figure 5A:
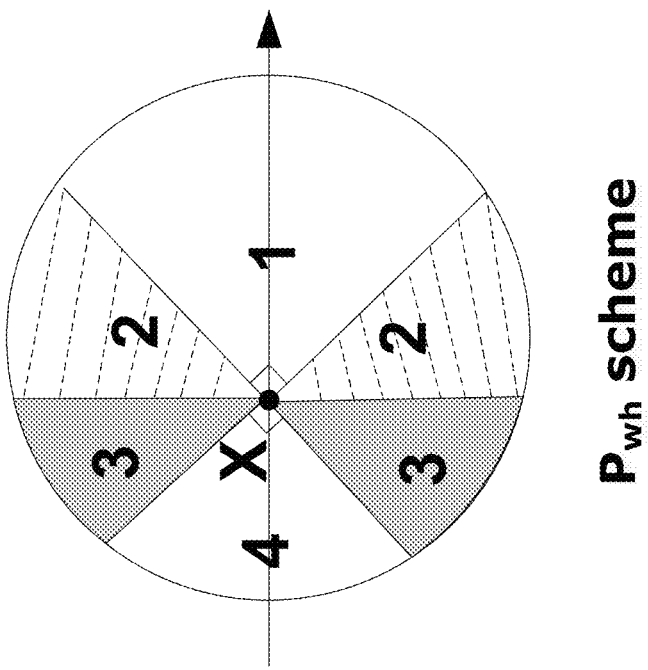
Figure 6:
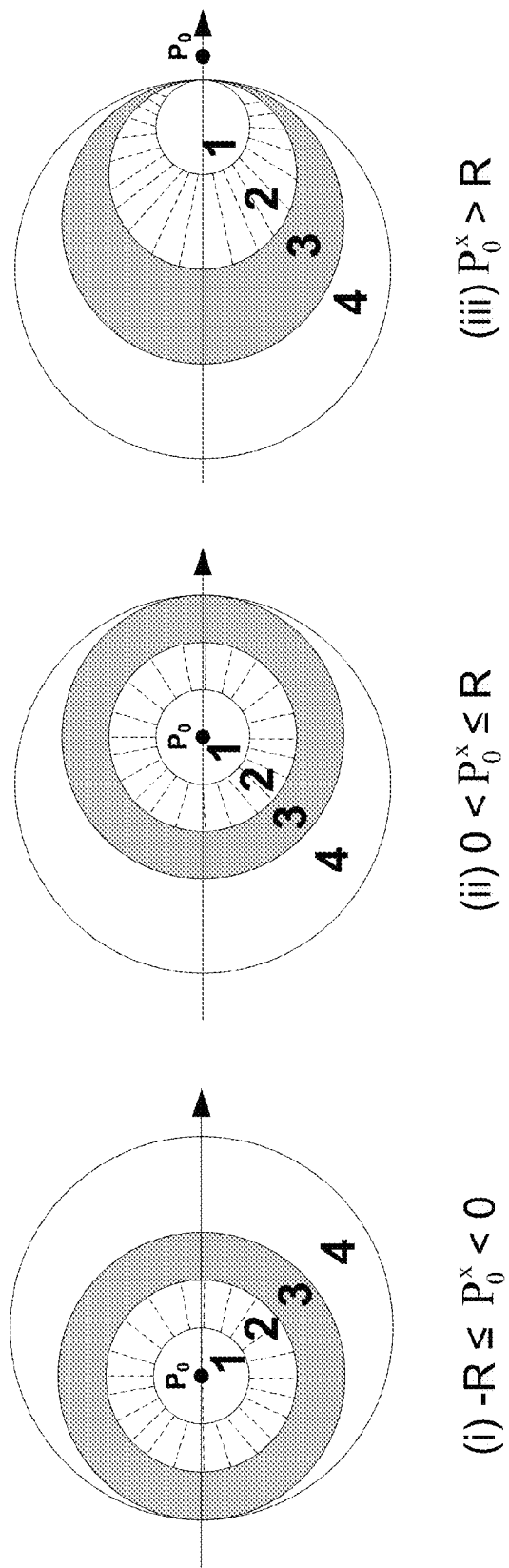
FIG. 6 depicts the disclosed $P_{drf}$ scheme for (i) $-R \le P_0^x < 0$, (ii) $0 < P_0^x \le R$, (iii) $P_0^x > R$, where the point $P_0 = (P_0^x, P_0^y)$ is the predicted position of the MT using the initial position X and the drift $\vec{\mu}$.

FIGS. 4A and 4B illustrate two conventional paging schemes: $P_{wh}$ scheme and $P_{rng}$ scheme, respectively. For simplicity, when considering delay constraints, we define a maximum paging delay of 4 to mean that the system must be capable of locating the called MT after at most 4 polling operations, and therefore the whole LA is divided into 4 sub-paging areas. In FIGS. 4-6, the labels 1, 2, 3, 4 denote the paging sequence.

$P_{wh}$ scheme: In this scheme, the delay constraints are not considered and therefore the whole LA is not divided into sub-areas. When a call arrives, the system will page all cells within the whole LA. This is the simplest scheme and we present this scheme for comparison with other paging schemes.

$P_{rng}$ scheme: In this scheme, the delay constraints are considered and the whole LA is divided into 4 rings with equal width based on the LA center, O. The $P_{rng}$ scheme is the so-called SDF scheme [1].

Compared with the conventional scheme, the disclosed LCO scheme has two major differences. First, for our location update scheme, the LA center may not be at the MT's initial position (e.g., O≠X in FIG. 1B). Second, for our terminal-paging scheme, the partition of the LA into sub-paging areas is always symmetric with respect to the diameter coinciding with the preferred direction, as shown in FIGS. 5 and 6.

B.2 Elaboration on the Disclosed Location Update Scheme

An issue in location update is how to design an LA so as to postpone the location-update event due to boundary crossing. There are two key design problems in the disclosed scheme: (1) How large should the LA be (e.g., for the circular LA in FIG. 2, what is the optimal LA size $R_{opt}$)? (2) What should be the optimal LA center when a new LA is formed (e.g., for the circular LA, how to determine the optimal position of the LA center according to the initial position of the MT)? In contrast, the usual location update scheme only focuses on the LA size since it always regards the initial position as the center of the LA.

Note that under Assumptions A1 and A2, another design issue is the optimal LA shape. However, investigating this issue is beyond the scope of the present work. On one hand, the theoretically optimal LA shape is very hard to find, because its solution is constrained by many factors (such as location management cost, the terminal paging delay, and the probability of the displacement numbers in each direction), and therefore might involve solving complex partial differential equations with complicated boundary conditions for the optimal distance in each direction. On the other hand, non-circular LAs may complicate the practical LA construction. The location update and terminal paging operations are generally applied to a whole cell (even if a part of the cell is included in the LA). Therefore, the practical LA shape design should also take into account the shape of cells, so that the LA can cover the least number of cells for a given area. The real cell usually resembles a circular area. The circular LA simplifies the practical LA construction, since it enables us to determine the number of cells that cover in the LA using only one parameter (i.e. the LA size). Instead of finding the optimal LA shape, by considering the given circular LA (which is introduced in Assumption A3), we study the optimal LA center and size that generate a near-optimal LA design solution. This lowers the complexity in analysis and design.

With the help of FIG. 2, we now explain the two design problems in detail.

The optimal LA size $R_{opt}$: Since the LA is a circular area, the size of the LA is defined by its radius R. This radius R is just the well-known distance threshold in the usual distance-based scheme. A larger R will make the MT take more time to leave the LA, leading to less-frequent updates and hence a reduction in the overall location-update cost. However, a larger R also means that there are more cells in the LA so that the paging cost will be higher. Therefore, given a characterization of the MT movement, there is an optimal distance threshold $R_{opt}$ to balance both costs.

The optimal offset $\|x_{opt}\|$: Since the LA is a circular area, the center of the LA is the circle center. Let X be the MT's initial position (i.e. the location where the MT performs its latest location update at the old LA). Intuitively, when the movement is unbiased, setting the LA center O to be the initial position X can reduce the frequency of location updates; however, when the movement is biased with a preferred direction, setting the LA center O to be away from X along the preferred direction (say, O is on the right side of X in FIG. 2) can delay the time that the MT moves out of the new LA. Then given a preferred direction, there is an optimal LA center that maximizes the boundary crossing time. We call $\|X\|$ the offset with respect to O. Then optimizing the LA center O is equivalent to finding the optimal offset $\|x_{opt}\|$ with respect to O.

In Section C, we will solve the joint optimization problem of $\|X\|$ and R. Once the optimal $\|X\|$ and R are calculated, we can construct an LA as follows.

The construction of the LA: For the circular LA, let the x-axis pass through the point X and let the positive direction of the x-axis be the preferred direction. Let the point, whose positive offset from point X equals to $\|x_{opt}\|$, be the origin O. Then the origin O and the radius $R_{opt}$ define an LA. Further, the network can determine the cells that constitute the LA. From this construction, the center of the LA is not always at the MT's initial position.

B.3 The Paging Schemes with Delay Constraints as Disclosed Herein

An issue in terminal paging is how to partition the LA into sub-paging areas so as to minimize the paging cost while satisfying delay requirements. Different from conventional paging schemes shown in Section C.1, we propose three paging schemes in which the partition of the LA is always symmetric with respect to the preferred direction. FIG. 5A, FIG. 5B and FIG. 6 illustrate the three schemes: $P_{ang}$ scheme, $P_{arc}$ scheme, and $P_{drf}$ scheme, respectively. To explain the three schemes, we assume the circular LA model, where the arrow direction denotes the preferred direction of the MT, the initial position of the MT is at the x-axis (i.e. X=(x, 0)), and the radius of the whole LA is equal to R. For illustration purpose, we also assume that the whole LA is divided into 4 sub-paging areas.

$P_{ang}$ scheme: In this scheme, the whole LA is divided into 4 sub-paging areas with substantially-similar angles based on the initial position of the MT, X. That is, the LA is divided in a pie-like manner with a common vertex selected to be X, and each sub-paging area has an interior angle at the common vertex where this interior angle is substantially similar to the interior angle of another sub-paging area.

$P_{arc}$ scheme: In this scheme, the whole LA is divided into 4 sub-paging areas with substantially-similar arc lengths based on the point X. That is, the LA is divided in a pie-like manner with a common vertex selected to be the point X, and each sub-paging area has an arc length opposed to the common vertex where this arc length is substantially similar to the arc length of another sub-paging area.

$P_{drf}$ scheme: In this scheme, the paging rule is: the larger the possibility that the called MT is currently resided in a sub-area, the higher the probability that the sub-paging area is paged first. With this idea in mind, we divide the whole LA into 4 sub-paging areas based on $P_0$, the predicted current position of the called MT. We use the initial position of the called MT, X, and the drift parameter of the MT, $\vec{\mu}$, to calculate the $P_0$ by $P_0 \triangleq (P_0^x, P_0^y) = X + \vec{\mu} \times (\text{current\_time} - \text{last\_update\_time})$, where the current_time denotes the time when the call arrives, and the last_update_time denotes the time when the called MT performs the last location update. Under Assumption A2, X is always on the x-axis and the function of the movement direction is an even function. Then, we have X=(x, 0) and $\vec{\mu} = (\mu_1, 0)$ from (1) and (2), where $-R \leq x \leq R$ and $\mu_1 \geq 0$. Therefore, we have $P_0^x \geq -R$ and $P_0^y = 0$.

When $P_0^x = 0$, the partition of the whole LA is exactly like that in $P_{rng}$ scheme.

When $P_0^x \neq 0$, we have three cases: (i) $-R \leq P_0^x < 0$, (ii) $0 < P_0^x \leq R$, (iii) $P_0^x > R$, as shown in FIG. 6. Cases (i)-(ii) are the general case where our paging scheme predicts that the MT is still within the current LA; in the general case, the MT usually sends a location update whenever moving to a new LA. Case (iii) is a special case where our paging scheme predicts that the MT is already out of the current LA. It includes two possibilities: (a) $P_0^x > R$, but the MT is actually within the current LA (which maybe incurs due to a prediction error), and (b) $P_0^x > R$, and the MT is really out of the current LA (which maybe incurs because non-perfect system operations such as not timely location update from the MT, lead to use an outdated initial position X in calculating $P_0^x$); in this situation, there is no way to find the MT unless the MT sends a new location update.

In Cases (i) and (ii), the partition of the LA is as follows: subarea 4=LA\{subarea 1, subarea 2, subarea 3}, where subarea 1, subarea 1+subarea 2, subarea 1+subarea 2+subarea 3, are 3 circular areas, whose centers are $P_0$ and whose radiuses are $(R-|P_0^x|)/3$, $2(R-|P_0^x|)/3$, $(R-|P_0^x|)$, respectively. In Case (iii), the partition of the LA is as follows: subarea 4=LA\{subarea 1, subarea 2, subarea 3}, where subarea 1, subarea 1+subarea 2, subarea 1+subarea 2+subarea 3, are 3 circular areas, whose centers are (3R/4, 0), (R/2, 0), and (R/4, 0), respectively, and whose radiuses are R/4, R/2, 3R/4, respectively.

C. The Cost Evaluation Framework as Disclosed

Under the CRTW mobility model, for a given preferred movement direction, this section discloses a novel and general framework based on the diffusion equation to analyze the total location-management cost. The mean total cost per unit time, $C_{total}$, consists of the mean location-update cost per unit time, $C_{update}$ and the mean terminal-paging cost per unit time, $C_{page}$, namely, $$C_{total} = C_{update} + C_{page} \qquad (4)$$

In the following, we first formulate the total cost, then calculate the mean location update interval, and finally optimize the offset $\|X\|$ and the LA size R.

Location-update cost $C_{update}$: Let U denote the cost of performing a location update. Let T denote the mean location update interval, i.e. the mean interval between two consecutive location update instants. $C_{update}$ is defined as U/T. Here, besides mobility patterns, the mean location update interval T depends on (i) the initial position X, (ii) the shape and size of the LA $\Omega$, (iii) the call arrival rate $\lambda$, and (iv) the tendency for the preferred direction, k. For example, if the tendency is the weakest, i.e. k=0, letting X=0 can maximize the exit time of the MT from the LA $\Omega$; if the LA size is larger, the exit time is longer; the larger the call arrival rate $\lambda$ is, the shorter the location update interval is. Because of these dependences, we denote $T \triangleq T(X, \Omega, \lambda, k)$ and thus $C_{update} \triangleq C_{update}(X, \Omega, \lambda,$ k). Under Assumption A3, i.e. that the LA $\Omega$ is a circular area with radius R, if X=(x, 0), we write T=T(x, R, $\lambda$, k) and thus $C_{update}=C_{update}(x, R, \lambda, k)$ becomes $$C_{update}=U/T(x,R,\lambda,k) \quad (5)$$

The key to evaluate the location-update cost is to calculate the mean location update interval, T. Theorem 1 in the next subsection states that if the MT's movement follows a diffusion process, the dependency of T on the initial position of the MT is captured by a backward differential equation for diffusion processes.

Terminal-paging cost $C_{page}$: The terminal-paging cost depends on the number of cells within the LA. Assume that the LA $\Omega$ is a circular area with radius R and the area per cell is equal to 1. There are $\pi R^2$ cells in total within the LA $\Omega$. Let V denote the cost of paging a cell and $\lambda$ denote the call arrival rate. Under Assumption A3, if the $P_{wh}$ paging scheme is adopted, $C_{page} \triangleq C_{page}(R, \lambda)$ is calculated by $$C_{page}=V\lambda\pi R^2. \quad (6)$$

In the present work, we theoretically analyze the $P_{wh}$ scheme but evaluate the other paging schemes via simulation. In theory, the dependency of the disclosed paging schemes (i.e. the $P_{ang}$, $P_{arc}$, and $P_{drf}$ schemes) on the initial position of the MT can be captured by a forward differential equation for diffusion processes. However, this involves solving the forward differential equation. Hence, it complicates the analysis.

C.1 Calculation of Mean Location Update Interval

In this section, we first present a theorem on the mean location update interval in (5) and then give its approximate solutions.

C.1.1 Mean Location Update Interval Theorem

Theorem 1 below states that the mean location update interval is governed by a partial differential equation if the MT's movement follows a diffusion process.

Theorem 1: (Mean location update interval theorem). Consider an MT moving within an LA $\Omega$. Suppose that the MT's movement follows a time-homogeneous diffusion process $\{Y(t), t\geq 0\}$ with a drift vector $\vec{\mu}=(\mu_1, \mu_2)$ and a diffusion coefficient matrix $$\vec{\sigma} = \begin{pmatrix} \sigma_{11} & \sigma_{12} \\ \sigma_{21} & \sigma_{22} \end{pmatrix},$$

where the MT's initial position $Y(0)=X=(x_1, x_2)\in\Omega$. For the distance-based scheme where the MT's initial position X may be off-center within the LA, if the call arrival process is a Poisson process with parameter $\lambda$, the mean location update interval $T=T(X, \Omega, \lambda, k)$ is governed by $$\begin{cases} \frac{1}{2}\sum_{ij}\sigma_{ij}\partial_{ij}T + \sum_j \mu_j\partial_j T = -1+\lambda T, & X \in \Omega \\ T(X, \Omega, \lambda, k) = 0, & X \in \partial\Omega \end{cases} \quad (7)$$

where $\partial_{ij}T = \frac{\partial^2 T(X, \Omega, \lambda, k)}{\partial x_i \partial x_j}, \partial_j T = \frac{\partial T(X, \Omega, \lambda, k)}{\partial x_j},$ and $\partial\Omega$ denotes the boundary of $\Omega$.

Proof: Please see Section G.2.

Theorem 1 holds as long as there are no holes in the LA $\Omega$. Following the proof, which makes full use of the backward equation with initial and boundary conditions built in the first-exit theory, we can obtain similar results for an arbitrary n-dimensional diffusion process. In addition, as explained in the Section G.2, the Poisson arrival assumption can be removed at the price of a slight increase in the computational complexity.

Applying Theorem 1 and the asymptotic property of the CTRW model stated in Section A.2, that is, the movement process described in the CTRW model can be approximated by a time-homogeneous diffusion process with parameters $\vec{\mu}$ and $\vec{\sigma}$ defined in (1), one obtains Corollary 1.

Corollary 1: Suppose that the MT's movement process $\{Z(t), t\geq 0\}$ follows the CTRW mobility model, where $Z(0)=X=(x, y)$ and $Z(t)$ is characterized by $(\vec{\chi}, \eta)$ in Section A.2. Under Assumptions A1 to A3, the mean location update interval $T=T(X, R, \lambda, k)$ is approximately governed by $$\begin{cases} \frac{\sigma_{11}}{2}T_{xx} + \frac{\sigma_{22}}{2}T_{yy} + \mu_1 T_x = -1+\lambda T, & \|X\|<R \\ T(X, R, \lambda, k) = 0, & \|X\|=R \end{cases} \quad (8)$$

where $T_x = \frac{\partial T}{\partial x}, T_{xx} = \frac{\partial^2 T}{\partial x^2}, T_{yy} = \frac{\partial^2 T}{\partial y^2},$ $$\sigma_{11} = \frac{\mathrm{Var}(\xi\cos\phi)E^2(\eta) + \mathrm{Var}(\eta)E^2(\xi\cos\phi)}{E^3(\eta)}$$

$$= \begin{cases} \frac{E(\xi^2)}{2E(\eta)}, & k \to 0 \\ \frac{\mathrm{Var}(\xi)E^2(\eta) + \mathrm{Var}(\eta)E^2(\xi)}{E^3(\eta)}, & k \to \infty \end{cases},$$

$$\sigma_{22} = \frac{\mathrm{Var}(\xi\sin\phi)}{E(\eta)} = \begin{cases} \frac{E(\xi^2)}{2E(\eta)}, & k \to 0 \\ 0, & k \to \infty \end{cases},$$

$$\mu_1 = \frac{E(\xi\cos\phi)}{E(\eta)} = \begin{cases} 0, & k \to 0 \\ \frac{E(\xi)}{E(\eta)}, & k \to \infty \end{cases}.$$

Remarks: From Corollary 1, if $k\to 0$, we have $\sigma_{11}=\sigma_{22}$ and $\mu_1 \approx 0$ (that is, if the tendency of the preferred direction is very weak, the movement process becomes an unbiased diffusion process); if $k\to\infty$, we have $\sigma_{11}>\sigma_{22}\to 0$ and $\mu_1>>1$ (that is, if the tendency is very strong, the movement process becomes a one-dimensional diffusion process).

We can solve the differential equation (8) using conventional numerical methods [28], but it is often time-consuming. In the next subsection, we present the approximate solutions, because they can not only provide reasonably accurate results, but also give more direct and deep insights to the drift and the diffusion coefficient.

C.1.2 Approximate Solution of Mean Location Update Interval

Under Assumptions A1 to A3, this section studies the approximate solutions to (8).

Approximate solutions: In general, the form of approximate solutions depends on the magnitude of the coefficients of the differential equation. So we first characterize the parameters in (8). The mean location update interval governed by (8) is determined by the call arrival process with parameter $\lambda$ and the approximate diffusion process of the MT. The diffusion process can be further decomposed into one pure diffusion process, described by the x-axis coefficient $\sigma_{11}/2$ and the y-axis coefficient $\sigma_{22}/2$, and one pure conduction process along the x-axis described by $\mu_1$. Under Assumption A2, the preferred direction of the MT (i.e. the positive direction of the x-axis) is preserved throughout the motion of the MT, and the diffusion process along the x-axis dominates over that along the y-axis (i.e. $\sigma_{11}/2 \geq \sigma_{22}/2$).

Let $\zeta$ denote the call arrival interval due to the call arrival process with parameter $\lambda$, $\tau_1$ denote the first exit time that the MT first hits or crosses the LA boundary due to the pure diffusion process along the x-axis with parameter $\sigma_{11}/2$, and $\tau_2$ denote the first exit time that the MT first hits or crosses the LA boundary due to the conduction process along the x-axis with parameter $\mu_1$. Since $\sigma_{11}/2 \geq \sigma_{22}/2$, we approximately calculate the mean location update interval $T = E(\min(\zeta, \tau_1, \tau_2))$. Note that the larger the $\lambda$ (or $\sigma_{11}/2$, or $\mu_1$) is, the shorter the $\zeta$ (or $\tau_1$, or $\tau_2$) is. The mean location update interval T is determined by those processes with larger parameters.

In the following, according to the relative magnitudes of $\sigma_{11}/2$ and $\max(\mu_1, \lambda)$, we roughly differentiate two cases which concern whether $\sigma_{22}$ is ignorable or not.

Case 1: $\sigma_{11}/2 > \max(\mu_1, \lambda)$. This means that the diffusion process, rather than the conduction process along the x-axis and the call arrival process, is dominant. Since $\sigma_{11}/2$ is always larger than $\mu_1$ in this case, it implies that the tendency of the preferred direction is weak (i.e. $k \to 0$). From Corollary 1, when $k \to 0$, we have $\sigma_{11} = \sigma_{22}$, and hence the diffusion process along the y-axis is non-ignorable. In this case, we use the two-order Galerkin method [28] to get the approximate solution to (8), as summarized in Corollary 2.

Corollary 2: Under Assumptions A1 to A3, if $\sigma_{11}/2 > \max(\mu_1, \lambda)$, the update interval T governed by (8) can be approximately given by $$T = A\phi_1 + B\phi_2 \quad (9)$$

where $\phi_1 = R^2 - x^2 - y^2$, $\phi_2 = (R^2 - x^2 - y^2)(x+y)$, $$A = \frac{3[\lambda R^2 + 4(\sigma_{11} + \sigma_{22})]/2}{(\mu_1 R)^2 + \lambda^2 R^4 + \frac{11}{2}\lambda R^2(\sigma_{11} + \sigma_{22}) + 6(\sigma_{11}^2 + \sigma_{22}^2) + 12\sigma_{11}\sigma_{22}}, \text{ and}$$

$$B = \frac{-3\mu_1}{(\mu_1 R)^2 + \lambda^2 R^4 + \frac{11}{2}\lambda R^2(\sigma_{11} + \sigma_{22}) + 6(\sigma_{11}^2 + \sigma_{22}^2) + 12\sigma_{11}\sigma_{22}}.$$

Proof: According to the Galerkin method, the trial function $\phi_i$ and the constants A and B satisfy the following equation:

$$\begin{pmatrix} \int\int_\Omega \varphi_1 L(\varphi_1) & \int\int_\Omega \phi_1 L(\varphi_2) \\ \int\int_\Omega \varphi_2 L(\varphi_1) & \int\int_\Omega \phi_2 L(\varphi_2) \end{pmatrix} \begin{pmatrix} A \\ B \end{pmatrix} = \begin{pmatrix} -\int\int_\Omega \varphi_1 \\ -\int\int_\Omega \varphi_1 \end{pmatrix} \quad (10)$$

where $L(\cdot) = [\sigma_{11}/2](\cdot)_{xx} + [\sigma_{22}/2](\cdot)_{yy} + \mu_1(\cdot)_x - \lambda(\cdot)$.

Then A and B can be obtained by solving (10).

Case 2: $\sigma_{11}/2 \leq \max(\mu_1, \lambda)$. This means that the call arrival process or the conduction process along the x-axis is dominant, namely, $\mu_1 \geq \sigma_{11}/2$ or $\lambda \geq \sigma_{11}/2$. When $\mu_1 > \sigma_{11}/2$, it implies that the tendency of the preferred direction is strong (i.e. $k \to \infty$). From Corollary 1, when $k \to \infty$, we have $\sigma_{11} > \sigma_{22} \to 0$ and $\mu_1 \gg 1$, and hence we ignore the diffusion process along the y-axis (that is, letting $\sigma_{22} = 0$). Similarly, when $\lambda > \sigma_{11}/2$, since $\sigma_{11}/2 \geq \sigma_{22}/2$, we ignore $\sigma_{22}$ as well. In this case, we reduce the two-variable equation (8) to a one-variable equation as in (11):

$$\begin{cases} \frac{\sigma_{11}}{2}T_{xx} + \mu_1 T_x = -1 + \lambda T, & |x| < R \\ T(x, R, \lambda, k) = 0, & |x| = R \end{cases} \quad (11)$$

where $T_x = \frac{dT}{dx}, T_{xx} = \frac{d^2 T}{dx^2}$.

EQN. (11) is a one-dimensional ordinary linear equation. Solving this equation, we have Corollary 3.

Corollary 3: (i) Under Assumptions A1 to A3, if $\sigma_{11}/2 \leq \max(\mu_1, \lambda)$, the update interval T governed by (8) can be approximately given by the solution to (11). The approximate solution is that $$T = C_1 e^{\lambda_1 x} + C_2 e^{\lambda_2 x} + 1/\lambda \quad (12)$$

where $$\lambda_1 = \frac{-\mu_1 - \sqrt{\mu_1^2 + 2\lambda\sigma_{11}}}{\sigma_{11}}, \lambda_2 = \frac{-\mu_1 + \sqrt{\mu_1^2 + 2\lambda\sigma_{11}}}{\sigma_{11}},$$

$$C_0 = \frac{e^{\lambda_2 R} - e^{-\lambda_2 R}}{e^{\lambda_1 R} - e^{-\lambda_1 R}}, C_2 = -\frac{1}{\lambda}\frac{1}{C_0 e^{\lambda_1 R} + e^{\lambda_2 R}}, C_1 = C_2 C_0.$$

(ii) For a given R, the optimal x, denoted as $x_{opt,R}(R) = x_{opt,R}$, which maximizes T in (12), is given by (13), and the maximum T is $T_{max} = T(x_{opt,R}, R, \lambda, k)$:

$$x_{opt,R}(R) = \left(\frac{1}{\lambda_2 - \lambda_1}\right)\ln\left(-\frac{C_1 \lambda_1}{C_2 \lambda_2}\right) \quad (13)$$

$$\to 0, \text{ if } \mu_1, \lambda \to 0.$$

Accuracy of approximate solutions: By separately handling two cases, $\sigma_{11}/2 > \max(\mu_1, \lambda)$ and $\sigma_{11}/2 \leq \max(\mu_1, \lambda)$, we simplify the differential equation and then present the approximation solutions. In Section D.A, we demonstrate via simulations that when $\sigma_{11}/2/\max(\mu_1, \lambda) \to 0$ or $\infty$, the approximations exhibit extremely high accuracy. In general, when $\sigma_{11}/2/\max(\mu_1, \lambda) < 0.1$ or $\sigma_{11}/2/\max(\mu_1, \lambda) > 5$, they are fairly accurate already. When $\sigma_{11}/2/\max(\mu_1, \lambda) \to 1$ (i.e. when the parameter values fall in the middle of the two cases, as shown for the k=0.06 case of FIG. 7B), the approximations exhibit inaccuracy; this inaccuracy is mainly due to the limitation of the adopted numerical approximation methods. For example, under the conditions of Corollary 2, we obtain an approximately symmetric equation (viz., $(\sigma_{11}/2)T_{xx} + (\sigma_{22}/2)T_{yy} = -1$, where $\sigma_{11} \approx \sigma_{22}$). Then we can solve the symmetric equation by the Galerkin method with symmetric trial functions (for example, $\phi_1(x, y) = \phi_1(y, x)$ as in Corollary 2). However, if the obtained equation is not symmetric, the solution from the Galerkin method might exhibit inaccuracy to some degree.

C.2 Joint Optimization of |x| and R

Under Assumptions A1 to A3, this section considers the joint optimization of the offset $\|X\|$ and the LA size R for the disclosed distance-based scheme. Note that in the disclosed scheme, the initial position of the MT is always at the x-axis, i.e. X=(x, 0), which is mentioned in the construction of the LA in Section B.2. Then $\|X\| = |x|$. Since we set the LA center to be the origin, finding the optimal |x| is equivalent to finding the optimal coordinate of x, denoted as $x_{opt}$.

From (4), (5), and (6), the total cost, $C_{total} \triangleq C_{total}(x, R, \lambda, k)$, is given by $$C_{total}(x, R, \lambda, k) = \frac{U}{T(x, R, \lambda, k)} + \lambda \pi R^2 V \quad (14)$$

From (14), the optimization problem can be expressed as follows: given $\lambda$ and k, we want to find the optimal coordinate of x (i.e. $x_{opt}$), and the optimal R (i.e. $R_{opt}$), namely, $$(x_{opt}, R_{opt}) = \underset{x,R}{\operatorname{argmin}} C_{opt}(x, R, \lambda, k). \quad (15)$$

In the following, we first consider the joint optimization for general cases and then perform asymptotic optimizations for some special cases.

C.2.1 Joint Optimization for General Cases

In general, the two-variable optimization problem in (15) can be numerically solved through many search algorithms after discretizing x and R. However, since X=(x, 0) is within the circular area with radius R, x depends on R. Therefore, we should find the optimization solution by taking the following two steps sequentially.

Step 1: Fix R and then find the conditionally optimal x that minimizes the total cost. For the given R, using a single-variable optimization algorithm similar to (16), we can find the optimal x, denoted by $x_{opt,R}$.

Step 2: Change R to find the unconditionally optimal R and x that minimize the total cost. Let R take all possible vales and for each R, repeat the aforementioned step 1 to find $x_{opt,R}$. Then from $\{(R, x_{opt,R}); R>0\}$, find the globally optimal (R, $x_{opt,R}$), denoted by ($R_{opt}, x_{opt}$).

When $x_{opt,R}$ is explicitly expressed in terms of R, we can find the unconditionally optimal solution, ($R_{opt}, x_{opt}$), by the following single-variable optimization algorithm in (16), where we assume that $x_{opt,R}=g(R)$ is expressed by (13):

$$\begin{cases} R_{opt} = \begin{cases} R_0, & \text{if } \Delta_R(R_1, \lambda, k) > 0 \\ \max\{R_j : \Delta_R(R_j, \lambda, k) \leq 0\}, & \text{otherwise} \end{cases} \\ x_{opt} = g(R_{opt}) \end{cases} \quad (16)$$

where $R_0$ denotes the initial value of R, $R_{step}$ denotes the step size, $R_j$ and $\Delta_R(R_j, \lambda, k)$ are defined as follows:

$R_j = R_{j-1} + R_{step}, j=1,2,3,\ldots$ $\Delta_R(R_j,\lambda,k)$ $= C_{total}(g(R_j), R_j, \lambda, k) - C_{total}(g(R_{j-1}), R_{j-1}, \lambda, k)$.

Algorithm (16) tries to find the locally optimal LA size, $R_{opt}$, by gradually increasing LA size from $R_0$. Also an LA contains at least one cell. Therefore, we should set $R_0$ to the radius of a cell. For the given initial value $R_0$, if increasing $R_0$ to $R_1$ will increase the total cost (i.e. $\Delta_R(R_1, \lambda, k)>0$), then we let $R_{opt}=R_0$. Otherwise, we continue to gradually increase the value of R until the next trial value, say, $R_{j+1}$, will increase the total cost (i.e. $\Delta_R(R_m, \lambda, k) \leq 0$ for $1 \leq m \leq j$ and $\Delta_R(R_{j+1}, \lambda, k)>0$); and then we let $R_{opt}=R_j$. Although algorithm (16) just seeks the local optimization, its outputs well match our simulation results.

C.2.2 Asymptotic Joint Optimization for Special Cases

This section considers the asymptotic joint optimization of x and R for k→0 and k→∞ when λ<<1. When λ<<1, the location update due to call arrival is negligible. Then we let λ=0 in (8) and can obtain an accurate approximate solution of the mean location update interval, as done in Section C.1.2. After that, we can perform asymptotic optimization based on the approximate solutions. Theorem 2 below summarizes the asymptotic result.

Theorem 2: Under Assumptions A1 to A3, for the distance-based scheme, where the MT's initial position X=(x,0) is unnecessarily at the center of the LA, when λ<<1, the $x_{opt,R}$, $T(x_{opt,R}, R, \lambda, k)$, $R_{opt}$, $x_{opt}$, and $C_{total}(x_{opt}, R_{opt}, \lambda, k)$, are approximated as follows:

$$x_{opt,R}(R) = \begin{cases} -\frac{3\gamma \sigma_{11} R}{8(\sigma_{11}+\sigma_{22})}, & k \to 0 \\ -R\left[1 - \frac{\ln(2\gamma)}{\gamma}\right], & k \to \infty \end{cases} = \begin{cases} 0, & k \to 0 \\ -R, & k \to \infty \end{cases}, \quad (17)$$

$$T(x_{opt,R}, R, \lambda, k) \approx \begin{cases} R^2/(\sigma_{11}+\sigma_{22}), & k \to 0 \\ 2R/\mu_1, & k \to \infty \end{cases},$$

$$R_{opt} \approx \begin{cases} \sqrt[4]{(\sigma_{11}+\sigma_{22})U/(\lambda V \pi)}, & k \to 0 \\ \sqrt[3]{U\mu_1/(4\lambda V \pi)}, & k \to \infty \end{cases},$$

$x_{opt} = x_{opt,R_{opt}}(R_{opt})$, $C_{total}(x_{opt}, R_{opt}, \lambda, k) \approx$ $$\begin{cases} 2\sqrt{(\sigma_{11}+\sigma_{22})\lambda U V \pi}, & k \to 0 \\ \sqrt[3]{(U\mu_1)^2 \lambda V \pi / 16}, & k \to \infty \end{cases},$$

where $\gamma=2\mu_1 R/\sigma_{11}$ can be regarded as the cumulative sum of displacement lengths before the MT moves out of the LA with radius R.

Proof: Please refer to Section G.3.

Remarks: (i) The conclusion on $x_{opt}$ in Theorem 2 is intuitive. If the movement is unbiased, an initial position at the center of the LA can maximize the mean location update interval. Whereas if the movement is biased with a positive direction, the MT's initial position that is at the negative x-axis may extend the mean update interval. In the extreme case, the initial position could be near the boundary of the LA, (−R, 0). (ii) When λ=0, k→0, $\sigma_{11} \to 1$, $\sigma_{22} \to 1$, (8) becomes the standard Poisson equation with the homogeneous boundary condition. From (17), we have $x_{opt,R}=0$ and $T(x_{opt,R}, R, \lambda, k)=R^2/2$. That is, if the initial position is at the origin, the solution to the standard Poisson equation is $R^2/2$, which is just the exact solution obtained using the formula in [29].

Theorem 2 holds with the general initial position X=(x, 0), where X is unnecessarily at the center of the LA. If X is always at the center of the LA, i.e. x≡0, following the proof of Theorem 2, we immediately arrive at Theorem 3.

Theorem 3: Under Assumptions A1 to A3, for the distance-based scheme, where the MT's initial position X=(0, 0), when λ<<1, $R_{opt}$ and $C_{total}(0, R_{opt}, \lambda, k)$ are approximated as follows:

$$R_{opt} \approx \begin{cases} \sqrt[4]{(\sigma_{11}+\sigma_{22})U/(\lambda V \pi)}, & k \to 0 \\ \sqrt[3]{2}\sqrt[3]{U\mu_1/(4\lambda V \pi)}, & k \to \infty \end{cases}; \quad (18)$$

-continued $$C_{total}(0, R_{opt}, \lambda, k) \approx \begin{cases} 2\sqrt{(\sigma_{11}+\sigma_{22})\lambda UV\pi}, & k \to 0 \\ \sqrt[3]{4}\sqrt[3]{(U\mu_1)^2 \lambda V\pi/16}, & k \to \infty \end{cases}.$$

Remarks: Compare (17) and (18) in terms of $R_{opt}$ and $C_{total}$. For the optimal offset and the center-initial-position, when $k \to 0$, we have that $R_{opt}$ and $C_{total}$ for both cases are roughly equal. However, when $k \to \infty$, $R_{opt}$ in the latter is about $\sqrt[3]{2}(\approx 1.260)$ times more than that of the former, and $C_{total}$ in the latter is about $\sqrt[3]{4}(\approx 1.587)$ times more than that of the former. Such observations have been verified indirectly in FIG. 8C via simulation. It reflects that making optimization on the offset $\|X\|$, which previous works [6]-[18] have not considered, has the potential of reducing the cost by 37%. Note that if we proceed to optimize the paging scheme using the initial position of the MT, we can improve the gain further.

D. Model Verification

This section presents simulation results to verify our theoretical results. In Section D.1, we validate the accuracy of approximate solutions for the mean location update interval. In Section D.2, we validate results on the joint optimization of the offset $\|X\|$ and the LA size R for the disclosed location update scheme when delay constraints are not considered. We compare the total cost when the conventional paging scheme (i.e. $P_{wh}$ and $P_{rng}$) and the disclosed paging schemes (i.e. $P_{ang}$, $P_{arc}$, and $P_{drf}$) are adopted, with the incorporation of delay constraints. Note that we have not compared the disclosed location update scheme (that optimizes the initial-position offset) with other location update schemes (such as that in 4G LTE). The reason is that in all existing distance-based schemes, the effect of the initial-position definition has never been discussed.

In simulations, the movement of the MT follows the CTRW mobility model and we adopt Assumptions A2 and A3. For the demonstration purpose, we assume that: the displacement length $\xi$ has an exponential distribution with mean $1/h$ km; the displacement time $\eta$ has a uniform distribution over the interval [a, b] seconds; the LA is a circular area with radius R km; the initial position of the MT is on the x-axis, i.e. $X=(x, 0)$; the preferred movement direction of the MT is the positive direction of the x-axis; and the probability density function of the displacement direction $\Theta$ is given by (3). For the given $\xi$ and $\Theta$, we can calculate the mean and variance of the displacement vector $\vec{\chi}$ by $$E(\vec{\chi}) = \frac{1}{h}\left(\frac{k^2(e^{k\pi}+1)}{(k^2+1)(e^{k\pi}-1)}, 0\right)$$

and $$Var(\vec{\chi}) = \frac{1}{h^2}\begin{pmatrix} \frac{2k^2+4}{k^2+4} - \left(\frac{k^2(e^{k\pi}+1)}{(k^2+1)(e^{k\pi}-1)}\right)^2 & 0 \\ 0 & \frac{4}{k^2+4} \end{pmatrix},$$

respectively, where k is the tendency for the preferred direction. Further, we calculate the diffusion coefficient, $\vec{\sigma}$, and the drift, $\vec{\mu}$, according to (1). In addition, we assume that the call arrival process is Poisson with rate $\lambda$ calls per seconds and we run each simulation for 2 days to obtain accurate simulation results.

D.1 Validation of the Accuracy of Approximate Solutions for the Mean Location Update Interval The accuracy of approximate solutions for the mean update interval is very important in evaluating the total location management cost correctly. This section validates the accuracy of the two approximate solutions: (9) obtained in Section C.1.2 when $\sigma_{11}/2/\max(\mu_1, \lambda) > 1$, and (12) otherwise. We consider four different scenarios. Table 1 presents their detailed parameter settings that are used to calculate the mean update interval according to (9) and (12). FIG. 7 illustrates the results as the call arrival rate, the displacement length, time and direction parameters vary. From these figures, we can see that the simulation curves well match the corresponding theoretical curves, indicating that the approximate solutions are very accurate. Here, we explain our observations in more details.

Figure 7A:
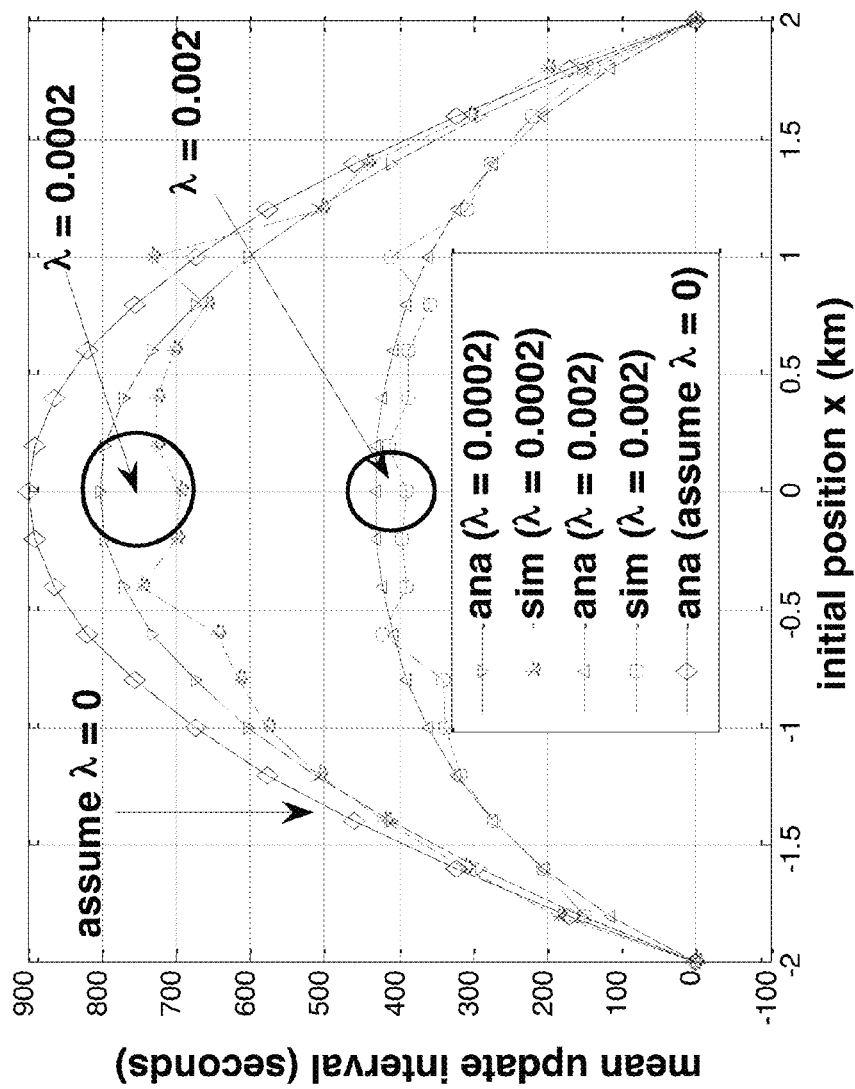
FIGS. 7A-7D plot the impact of parameters on the mean update interval against: $\lambda$ in FIG. 7A; k in FIG. 7B; h in FIG. 7C; and [a, b] in FIG. 7D. Note that in FIG. 7A, the black and diamond curve is plotted by (9) with an assumption of $\lambda$=0.

FIG. 7A illustrates the impact of $\lambda$ in Scenario 1. From FIG. 7A, we can see that the mean update interval for $\lambda = 0.0002$ is significantly larger than that for $\lambda = 0.002$. The reason is that the location update in the former is mainly due to the motion out of the LA boundary while the location update in the latter is mainly due to newly received calls. In prior studies, the impact of $\lambda$ is often ignored (i.e. $\lambda = 0$ is assumed) in the location-update cost [8]-[10], [12], [25]. To demonstrate that the impact of $\lambda$ is non-ignorable, we plot the black and diamond curve by (9) under the condition that $\lambda = 0$. Comparing the two curves when $\lambda = 0.002$ and 0, we can see that replacing $\lambda$ from 0.002 to 0 causes large errors in calculating the mean location update interval, thus leading to significant inaccuracy in the location-update cost evaluation. On the other hand, comparing the two curves for $\lambda = 0.0002$ and $\lambda = 0$, the error between the mean update intervals is small, indicating that we can ignore the update cost due to received calls only if $\lambda \ll 1$.

Figure 7B:
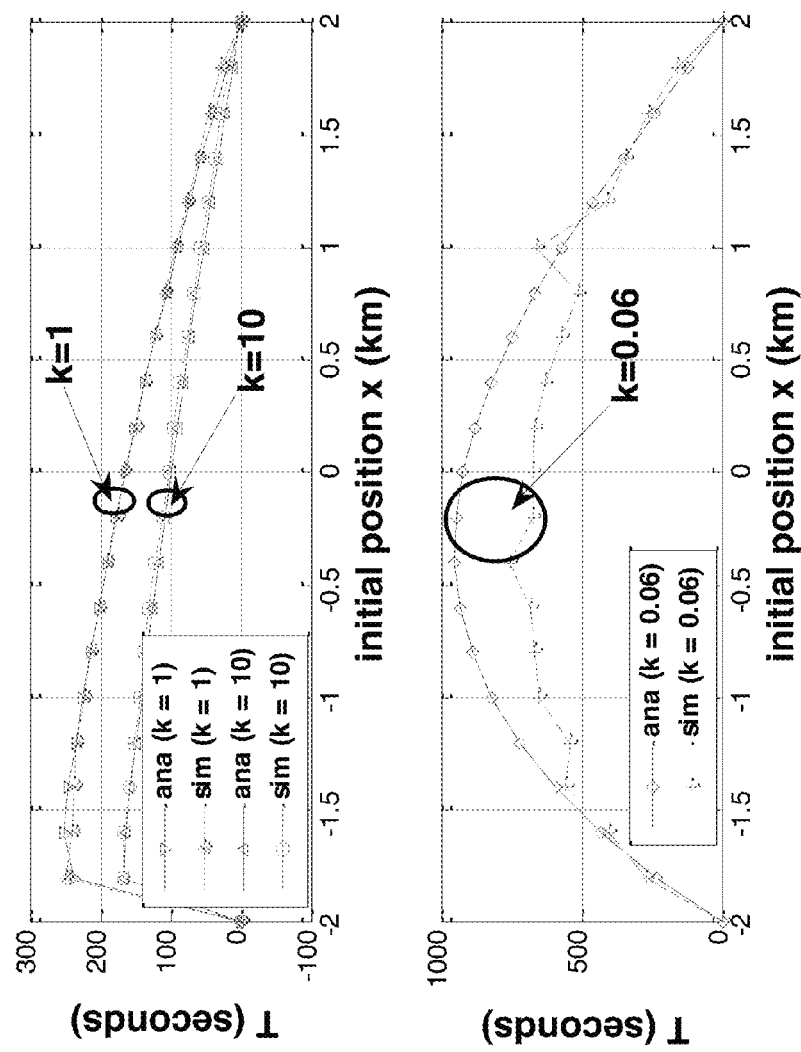

FIG. 7B (including two subfigures) illustrates the impact of k in Scenario 2. The top subfigure shows that for $\sigma_{11}/2/\max(\mu_1, \lambda) < 1$ (that is, the movement along the positive x-axis direction dominates), the curve when $k = 10$ is below that when $k = 1$. The explanation is that the larger k value corresponds to a faster MT movement (see the limitation of $\mu 1$ when $k \to 0, \infty$ in Corollary 1), although it also causes the MT to travel a longer distance before leaving the LA. Overall, however, the gain from the speed improvement dominates over the loss due to the distance increase, and consequently the MT will leave the LA more quickly. The bottom subfigure shows that when $\sigma_{11}/2/\max(\mu_1, \lambda) \to 1$ (here the value is 1.309528 for $k = 0.06$), the approximate solutions exhibit inaccuracy; this inaccuracy is mainly due to the limitation of the adopted numerical approximation methods.

Figure 7C:
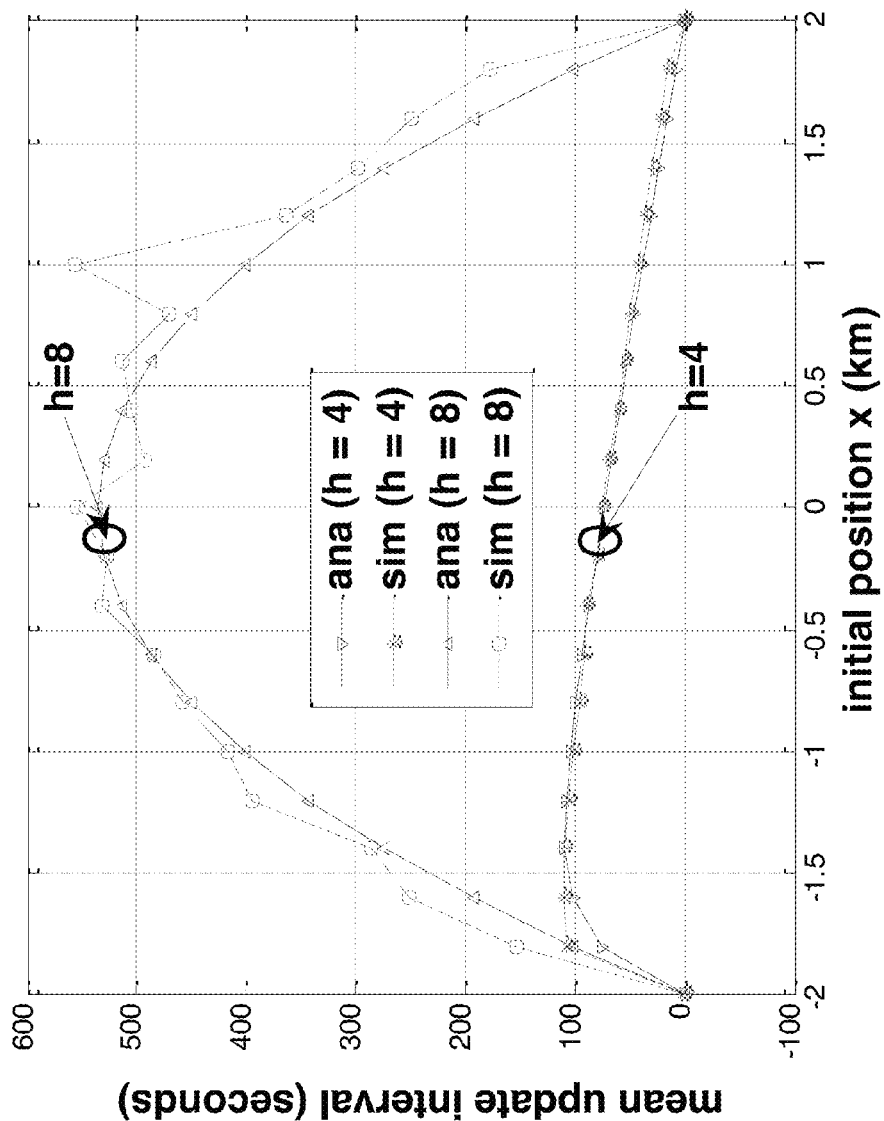

FIG. 7C illustrates the impact of h in Scenario 3. Theoretically, achieving high accuracy of diffusion approximation requires that the number of road section traveled should be sufficiently large, i.e. $n(t) \gg 1$. Assumption A1 that the ratio of the LA radius to the mean length of road section is sufficiently large, i.e. $R/E(\xi) \gg 1$, necessarily leads to $n(t) \gg 1$. Since a same road section can be traveled multiple times, $R/E(\xi) \gg 1$ is unnecessary. In the simulation, $R/E(\xi) = Rh$. The star curve in FIG. 7C shows that even if Rh is a moderate value, such as $Rh = 2 \times 4 = 8$, the diffusion approximation is very accurate already.

TABLE 1

Parameters for calculating the mean update interval in four different scenes (R = 2; $x_{step}$ = 0.1 · R; x = −R; $x_{step}$: R). Note that we calculate the mean update interval by (9) when $\sigma_{11}/2/\max(\mu_1, \lambda) > 1$, and (12) otherwise.

| Scenario | [a, b] | h | k | $\lambda$ | $\sigma_{11}/2/\max(\mu_1, \lambda)$ |
|---|---|---|---|---|---|
| 1: Impact of $\lambda$ | [1, 10] | 10 | 0 | 0.0002 | 5.559730 |
|  | [1, 10] | 10 | 0 | 0.002 | 0.555973 |
| 2: Impact of k | [1, 10] | 10 | 1 | 0.002 | 0.088882 |
|  | [1, 10] | 10 | 10 | 0.002 | 0.060599 |
|  | [1, 10] | 10 | .06 | 0.0002 | 1.309528 |
| 3: Impact of h | [1, 10] | 8 | 0 | 0.0002 | 8.687077 |
|  | [1, 10] | 4 | 1 | 0.002 | 0.222206 |

TABLE 1-continued

Parameters for calculating the mean update interval in
four different scenes (R = 2; $x_{step} = 0.1 \cdot R$; $x = -R$; $x_{step}$: R).
Note that we calculate the mean update interval by (9)
when $\sigma_{11}/2/\max(\mu_1, \lambda) > 1$, and (12) otherwise.

| Scenario | [a, b] | h | k | λ | $\sigma_{11}/2/\max(\mu_1, \lambda)$ |
|---|---|---|---|---|---|
| 4: Impact of [a, b] | [1, 10] | 8 | 0 | 0.0002 | 8.687077 |
| | [1, 1] | 4 | 1 | 0.002 | 0.207000 |

Figure 7D:
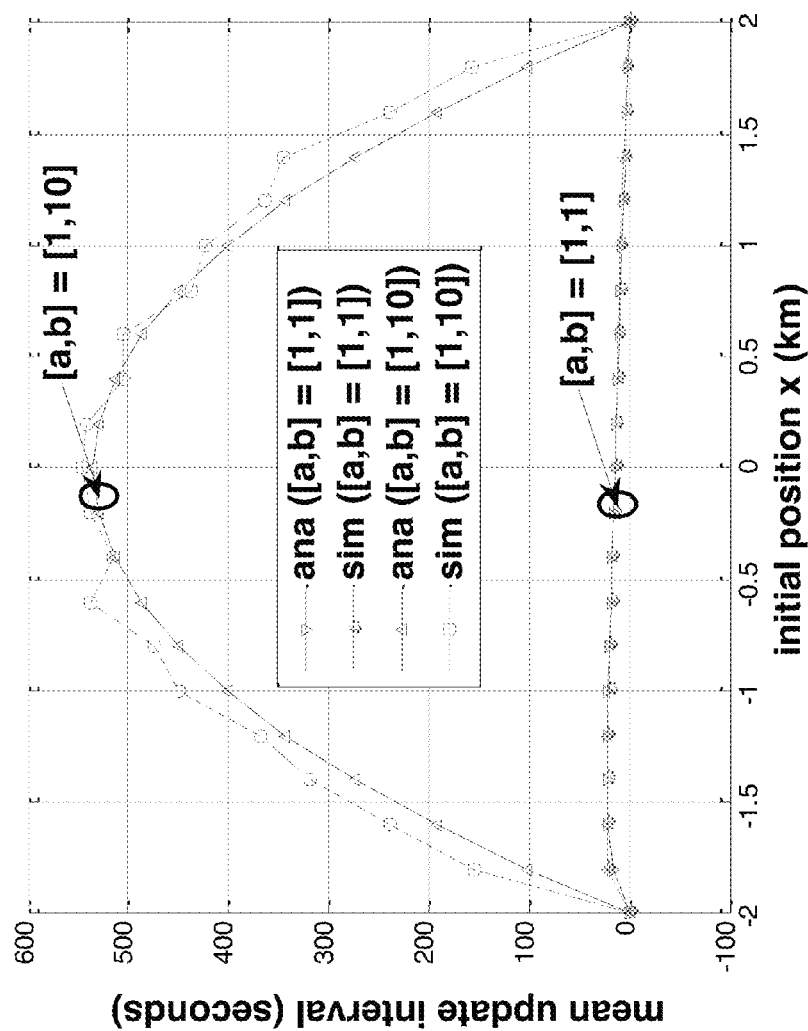

FIG. 7D illustrates the impact of [a, b] in Scenario 4. Comparing curves between [a,b]=[1,1] and [1,10], we can see that (i) the smaller the mean displacement time, (a+b)/2, is, the shorter the mean location update interval is, and that (ii) the theoretical results more accurately fit the corresponding simulation results if the displacement time is constant.

D.2 Joint Optimization of the Offset |x| and the LA Radius R

Figure 8A:
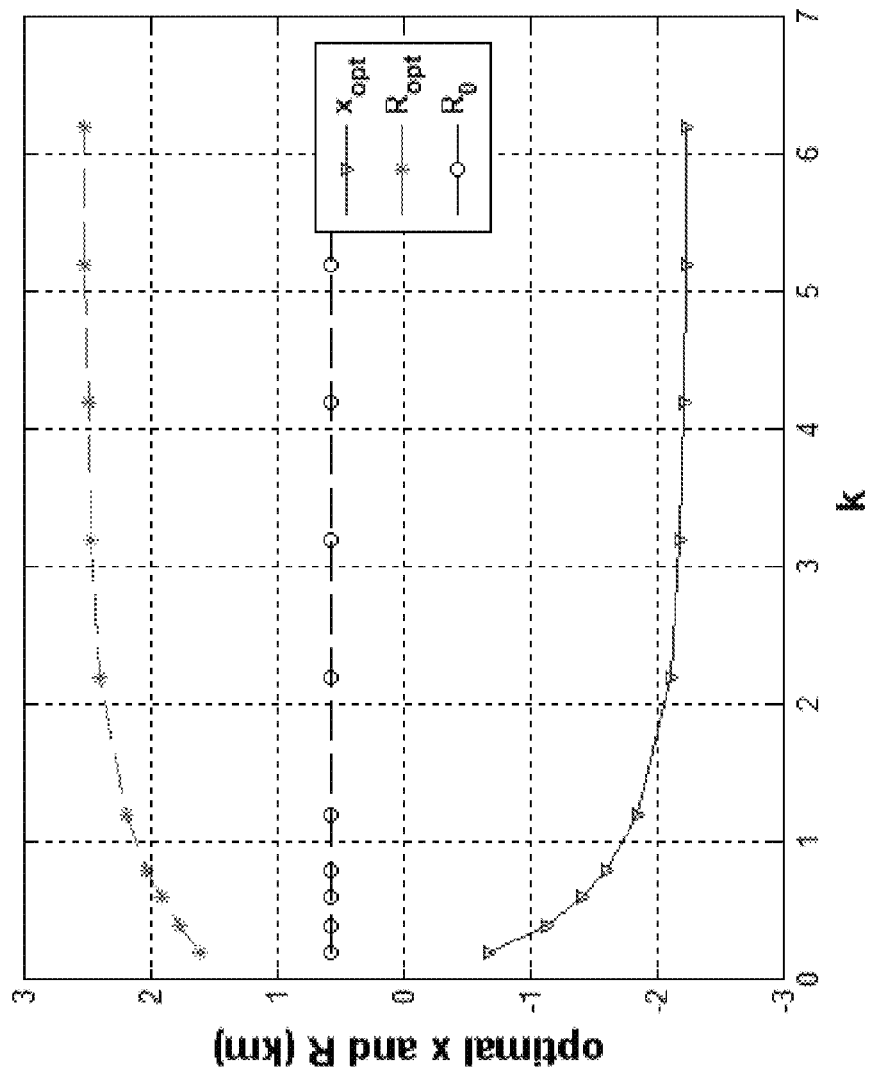
FIGS. 8A-8C illustrate: the optimal x and R in FIG. 8A; the mean update interval in FIG. 8B; and the total cost with the joint optimization in FIG. 8C.
Figure 8B:
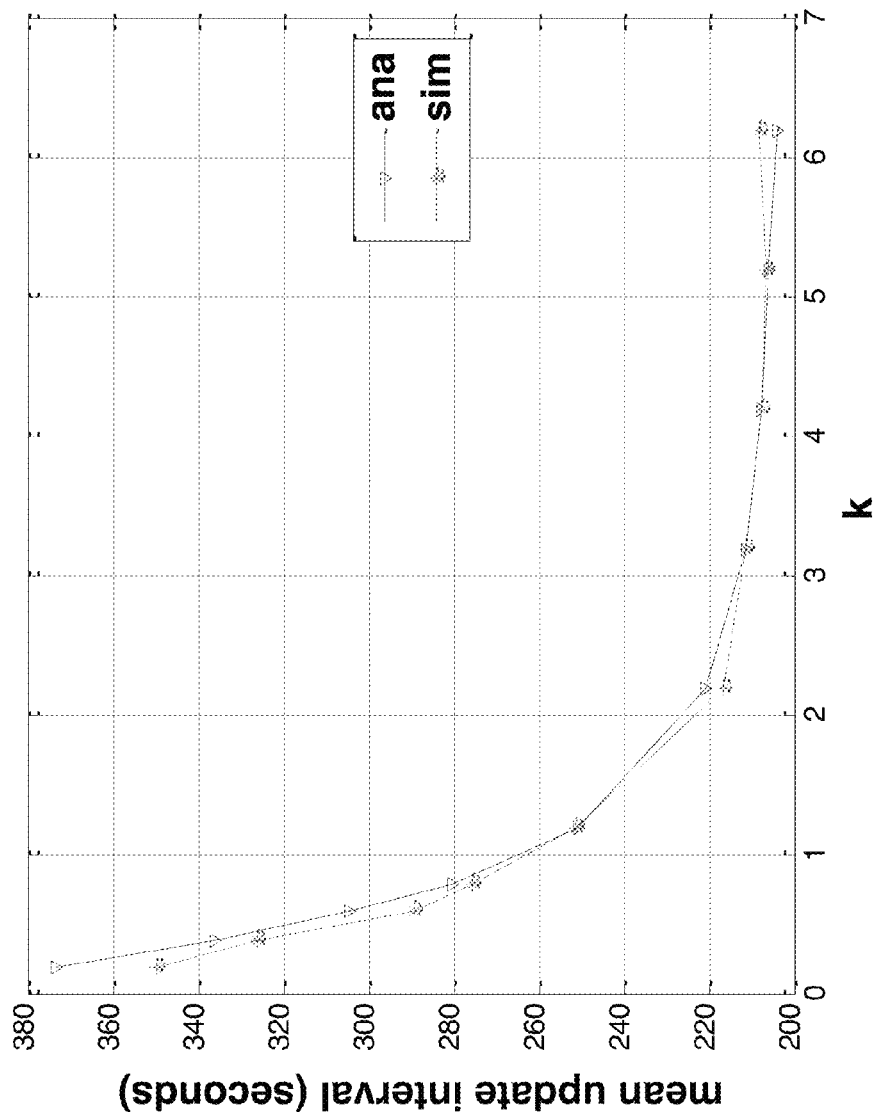
Figure 8C:
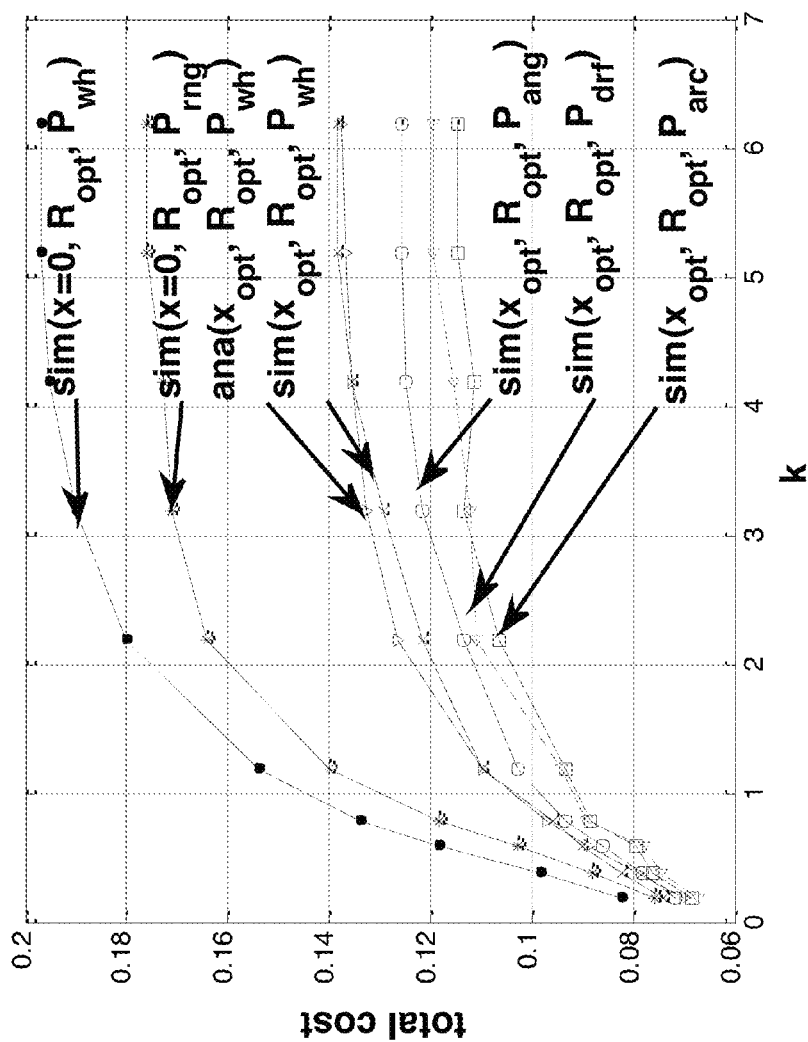

This section validates the joint optimization solutions proposed in Section C.2. The joint optimization solutions depend on the approximate solutions of the mean update interval, which are classified into two cases in Section C.1.2). The accuracy of the joint optimization for Case 2 (i.e. the case of $\sigma_{11}/2 \leq \max(\mu_1, \lambda)$), is our focus, where the two-variable joint optimization issue is significantly simplified to a one-variable optimization problem, as the $R_{opt}$ and $x_{opt}$ are given by (16). We assume that the area per cell is equal to 1 and therefore set the iterative initial value $R_0$ to the value of $1/\sqrt{\pi}$ for the cell radius, in order to run the algorithm of (16). Table 2 presents other parameters used for calculating the values of the joint optimization solutions. FIGS. 8A-8C give the results on the joint optimization.

TABLE 2

Parameters used in the joint optimization of |x| and R.

| [a, b] | H | λ | U | V |
|---|---|---|---|---|
| [1, 10] | 10 | 0.002 | 20 | 1 |

FIG. 8A plots the optimal x and R when k varies, as well as the iterative initial value $R_0$ used in (16). From FIG. 8A, it is shown that when the preference of the movement direction is weak (say, when k<3), as k decreases, $R_{opt}$ decreases, but $R_{opt}/|x_{opt}|$ increases (e.g., $R_{opt}/|x_{opt}|=2.5/2.1=1.1905$ for k=3 and $R_{opt}/|x_{opt}|=1.6/0.6=2.6667$ for k=0.3), implying that the offset becomes smaller. The reason is as follows. When the preference is weak, decreasing R will reduce the paging cost but it possibly increases the boundary crossing probability as well; therefore, by setting the LA center to be near the initial position, we can maximize the mean update interval (as shown in FIG. 8B) and minimize the total cost (as shown in FIG. 8C). On the other hand, when the preference of the movement direction is strong (say, when k>3), the optimal x and R are almost flat in FIG. 8A, indicating that they are insensitive to k. The reason is as follows. When the preference is strong, the location-update cost due to boundary crossing will dominate in the total cost. Increasing the LA size does not significantly reduce the location-update cost (as indicated in the curve when k>3 in FIG. 8B), and instead it will increase the terminal-paging cost. Therefore, keeping the LA size fixed can achieve the almost minimal total cost.

FIG. 8B plots the mean update interval when k varies. From FIG. 8B, we can see that the mean location update interval decreases as k increases. When k is small (say, k<3), the curve decreases very fast. When k is larger (say, k≥3), it decreases slowly. In addition, the theoretical curve well matches the corresponding simulation curve, indicating our approximation is accurate to within 3%.

FIG. 8C plots the total cost as k varies. In FIG. 8C, the curve labeled by $(x_{opt}, R_{opt}, \bullet)$ represents the total cost when the optimal offset $|x_{opt}|$, the optimal radius $R_{opt}$ and the paging scheme ● are adopted, where $(x_{opt}, R_{opt})$ is shown in FIG. 8A and is calculated by the algorithm of (16), and ● denotes $P_{wh}, P_{ang}, P_{arc},$ or $P_{drf}$. Note that for the $P_{wh}$ scheme, the ∇ and x curves respectively correspond to the theoretical and simulated results. The good match between the two curves indicates that our joint optimization results given by (4) and (16) are accurate to within 3%. From these curves, the total costs with the $P_{arc}$ and $P_{drf}$ schemes are minimal because the two schemes more effectively utilize the movement directionality to reduce the paging cost; the total cost with the $P_{wh}$ scheme is the maximal because this scheme does not do any optimization to reduce the paging cost; and the total cost with the $P_{ang}$ paging scheme is between the minimum and the maximum.

In FIG. 8C, the curve labeled by $(x=0, R_{opt}, \bullet)$ represents the total cost when the LA center is the initial position, $R_{opt}$ computed by (18) and the paging scheme ● are adopted, where ● denotes $P_{wh}$ or $P_{rng}$. Compared with the total cost of the case that $x_{opt}$ is adopted, the total costs when x=0 are much higher. For example, when the $P_{wh}$ scheme is adopted, λ=0.002 and k=6, the simulated total cost for x=0 is almost more than the one for $x_{opt}$ by a factor of 1.5. This value matches the factor $\sqrt[3]{4}(1.587)$ given in Theorem 3. This high cost indicates that optimizing the offset is very necessary and hence advantageous.

E. LCO Implementation Considerations

This section elaborates implementation aspects of the disclosed LCO scheme.

The inputs of the LCO scheme are three sets of physical parameters (PM): PM1={k, E(ξ), Var(ξ) E(η), Var(η)}, PM2={x, $\vec{d}$}, and PM3={λ, U, V}, where $\vec{d}$ denotes the preferred direction of the MT during its current movement, and the other notations are defined in Sections A and C. Similar to [7] and [24], we assume that the MT can estimate these parameter values via some methods such as [31] and [32].

Figure 9:
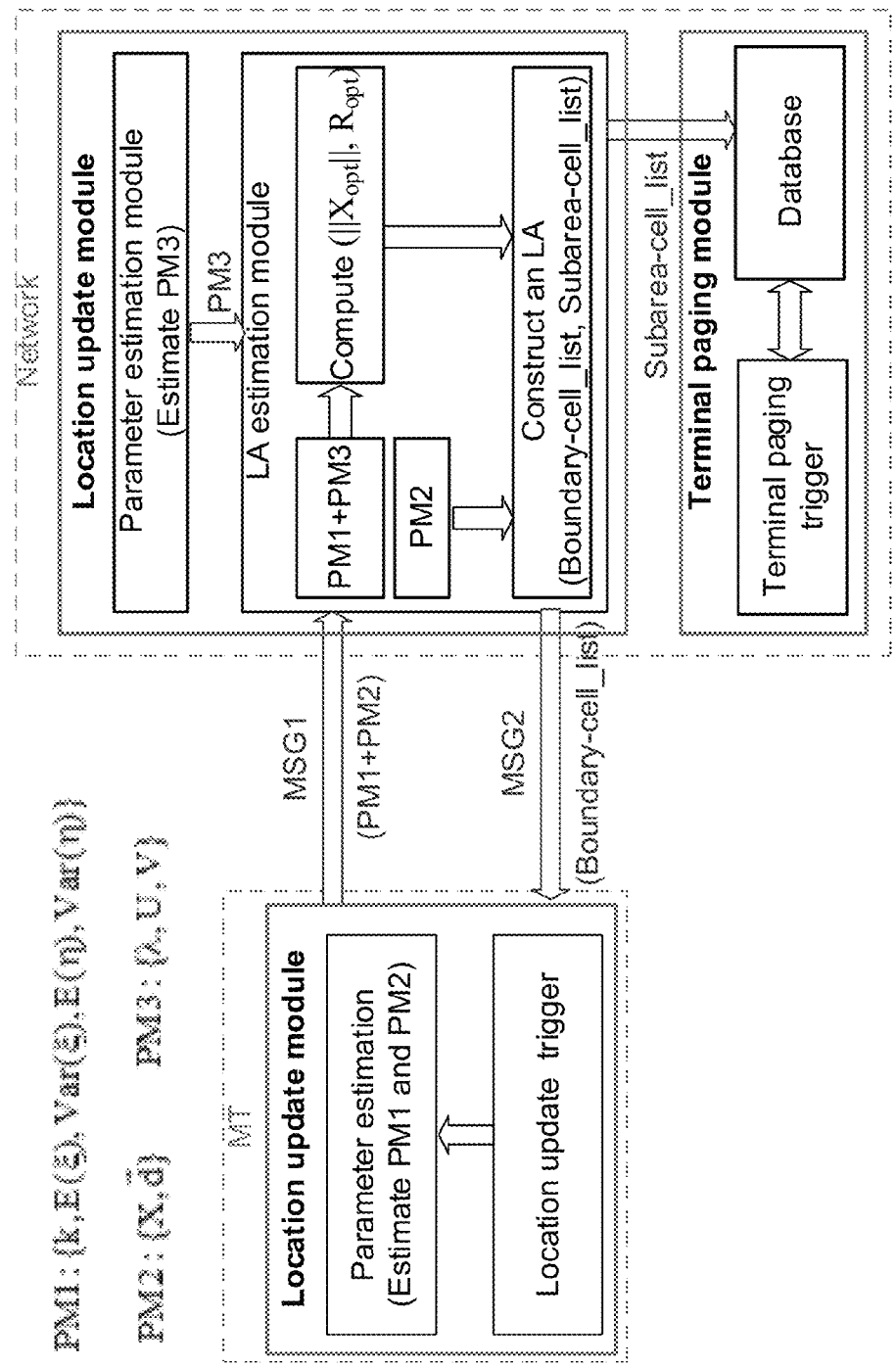
FIG. 9 depicts an architecture for implementing the LCO scheme.

The outputs of the LCO scheme are one boundary-cell list and m subarea-cell lists, where m is the maximum allowable paging delay. In LCO, each cell of an LA is classified into either a boundary cell (i.e. a cell next to the LA boundary) or an interior cell (i.e. a cell except the boundary cells). All interior cells are further divided into m subarea cells according to the page subareas. The boundary-cell list contains the identities of all boundary cells, while one subarea-cell list contains the identities of the corresponding subarea cells. The architecture implementing the LCO scheme is illustrated in FIG. 9. The MT, in collaboration with the network, performs the location update procedure. The location update module in the MT includes the "parameter estimation" and "location update trigger" sub-modules. The location update module in the network includes the "parameter estimation" and "LA estimation" sub-modules. In addition, the terminal paging module in the network is responsible for sending a paging message to identify the current cell location of the MT. With the help of FIG. 9, we next present the location-update and terminal-paging procedures of the LCO scheme.

The location update procedure: The location update can be triggered by the MT or the network. For a focus, we describe the MT-triggered implementation below; the main concept also applies to the network-triggered implementation—it is all a matter of who is responsible for keeping track of the state of the MT.

The MT operates as follows. When entering a cell, the MT will receive a cell identity broadcasted by the cell's base station. If the received cell identity is in the boundary-cell list, the location update procedure will be triggered by the "location update trigger" sub-module, which then invokes the "parameter estimation" sub-module to estimate PM1 and PM2. After assembling PM1 and PM2 into a piece of message (see MSG1 in FIG. 9), the MT sends this message to the network. If the received cell identity is not in the boundary-cell list, the MT only computes some necessary information depending on the parameter estimation method. On the other hand, upon receiving the boundary-cell list from the network, the MT stores the list in its memory, so that it knows when to trigger the next location update in the future, by checking if the received cell identify is in the boundary-cell list.

The network operates as follows. Upon receiving the location-update message (including PM1 and PM2) from the MT, the network first estimates PM3 by calling the "parameter estimation" sub-module, then computes $\|x_{opt}\|$ and $R_{opt}$ by PM1, PM3, and the method in Section IV.B.1), next constructs a new LA (as explained in Section III.B) by $\|x_{opt}\|$, $R_{opt}$, and PM2, and produces the boundary-cell and subarea-cell lists. Finally, the network sends the boundary-cell list to the MT (see MSG2 in FIG. 9) and delivers the subarea-cell list to the terminal paging module.

The terminal paging procedure: When a call to identify the location of an MT arrives, the network sequentially pages the sub-paging area by the subarea-cell lists.

F. The Present Invention

The theoretical results obtained in Sections A-D are used in the development of the present invention as detailed as follows.

An aspect of the present invention is to provide a method for updating a location of a MT for a mobile communication network when the MT crosses a boundary of a first LA assigned to the MT. The mobile communication network comprises one or more computers for executing the disclosed method. Each computer can be a standalone computer, a computing server, a distributed server in a computing cloud, or any computing device. The method comprises determining, by the one or more computers, a second LA to be assigned to the MT for replacing the first LA where the second LA is characterized by a LA center and a LA size. In particular, the LA center and the LA size are determined by numerically optimizing the LA center and the LA size in a sense that a mean total location-management cost predicted for the LA center and the LA size is minimized without restricting the LA center to be fixed at the initial position. (The initial position of the MT is regarded as a location where the MT performed a latest location update at the first LA before crossing the boundary.) Preferably, the mean total location-management cost is given by a sum of a mean location-update cost and mean terminal-paging cost.

In practical implementations of the disclosed method, a local optimization algorithm, which is a numerical procedure for locating a local minimum, may be used in determining the LA center and the LA size.

In some embodiments, the LA center is located at a distance $x_{opt}$ from the initial position in a preferred direction, and the LA size is determinable by a LA radius, denoted as $R_{opt}$. The preferred direction is an estimated movement direction of the MT based on analysis of mobility patterns of the MT. Synonymously, herein "a preferred direction" is also called as "a preferred movement direction."

According to Section C.2.1, $x_{opt}$ and $R_{opt}$ may be determined by the following procedure. First, a plurality of candidate LA-radius values is generated. For an individual candidate LA-radius value, denoted as R, a corresponding distance $x_{opt,R}$ that minimizes the mean total location-management cost conditioned on R is determined. In some implementations, $x_{opt,R}$ may be obtained from R by using a single-variable optimization algorithm. Repeat the aforementioned step for all the candidate LA-radius values to thereby obtain plural tuples of $(R, x_{opt,R}, C_{total}|R,x_{opt,R})$ where $C_{total}|R,x_{opt,R}$ is a value of the mean total location-management cost computed for R and $x_{opt,R}$. Finally, one can identify an optimal candidate pair among the plural candidate pairs such that the optimal candidate pair has the lowest value of $C_{total}|R,x_{opt,R}$ among the plural candidate pairs. The values of R and $x_{opt,R}$ of the optimal candidate pair are $R_{opt}$ and $x_{opt}$, respectively.

The determination of $R_{opt}$ and $x_{opt}$ may also be performed according to one or more of (13), (16) and (17).

A first process as set forth in any embodiment disclosed above on the method for updating the location of the MT may be included in a method for managing the MT's location for the mobile communication. The method for managing the location of the MT further includes a second process of partitioning the second LA into a plurality of sub-paging areas for allowing the mobile communication network to select one or more such sub-paging areas to page the MT when a call arrives at the network.

According to Section B.3, the second process is preferably realizable as a $P_{ang}$ scheme, a $P_{arc}$ scheme, or a $P_{drf}$ scheme. By realizing the $P_{ang}$ scheme, the second process comprises dividing the second LA in a pie-like manner to yield a pre-determined number of sub-paging areas with a common vertex selected to be the initial position and with substantially-similar interior angles measured at the common vertex. If the $P_{arc}$ scheme is used, the second process comprises dividing the second LA in a pie-like manner to yield a pre-determined number of sub-paging areas with a common vertex selected to be the initial position and with substantially-similar arc lengths. When the $P_{drf}$ scheme is adopted, the second process comprises dividing the second LA into a pre-determined number of ring-shaped segments so that each of the ring-shaped segments is one of the sub-paging areas.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

G. Appendices

Figure 10:
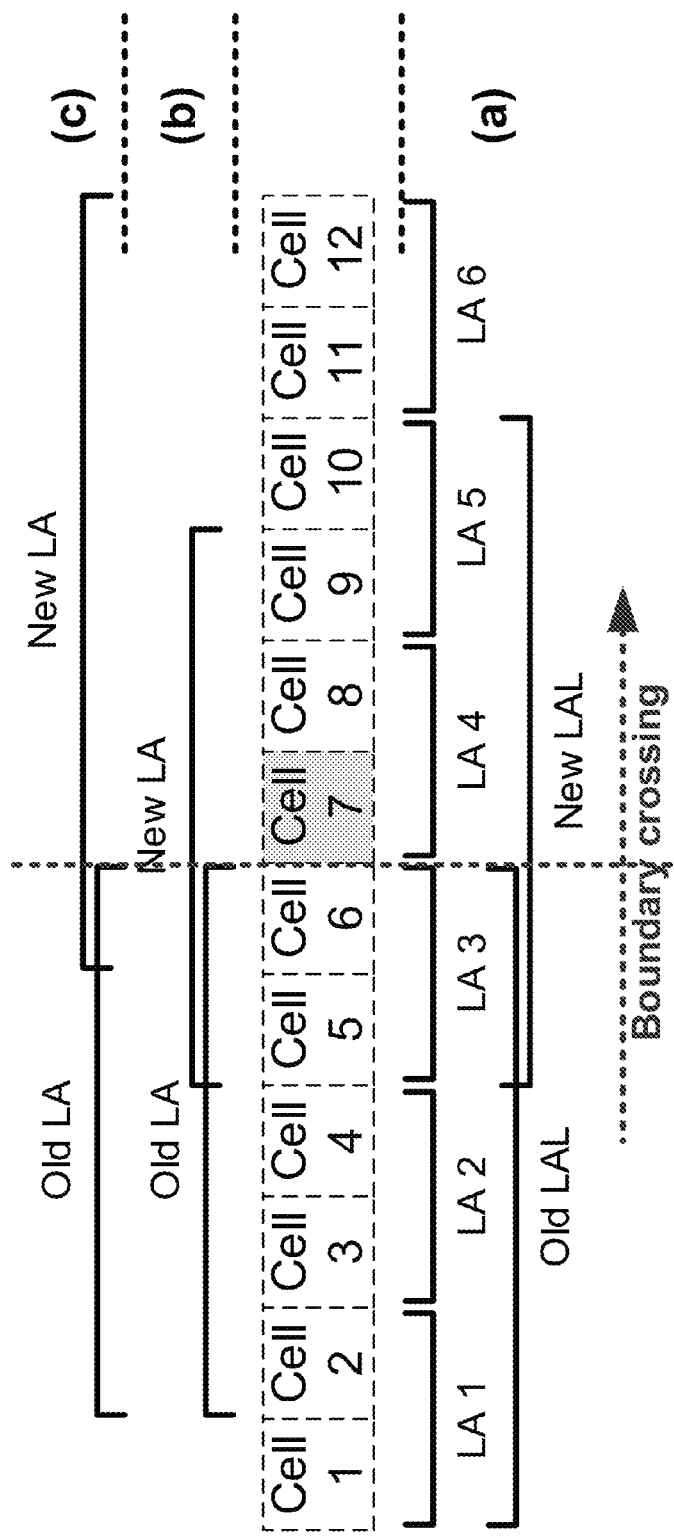
FIG. 10 shows examples for a location management scheme in 4G LTE, a usual distance-based scheme, and the disclosed distance-based scheme.

G.1 Comparison Among the Scheme in 4G LTE, a Usual Distance-Based Scheme, and the Scheme as Disclosed Herein In this appendix, assuming that the coverage area of cellular networks is a one-dimensional space, with the help of FIG. 10, we first illustrate the location management in 4G LTE, the usual distance-based scheme, and the proposed distance-based scheme, and then summarize their characteristics in Table 3. In the following, the term "critical cell" refers to a cell where the MT is paged, makes calls, or performs location update.

Location management scheme in 4G LTE. The location management scheme in 4G LTE is very similar to the usual distance-based scheme. In the scheme, the cells are grouped into the LAs (note that the LA is called the tracking area in 4G) and the LAs are further grouped into LA lists (LALs). For example, in part (a) of FIG. 10, the old TAL={LA1, LA2, LA3}.

In the location update procedure in 4G LTE, each cell periodically broadcasts its LA identity. The MT listens to the broadcast LA identity and checks if the received LA identity is in its current LAL. If not, it means that the MT moves out of the current LAL; then the MT performs a location update and consequently the network will create a new LAL for the MT. The LAL is assigned on a per-MT basis and the central LA of the TAL includes the critical cell. For example, in part (a) of FIG. 10, when the MT moves to Cell 7 from Cell 6, the MT will perform a location update in Cell 7 because Cell 7 is not in the old LAL={LA1, LA2, LA3}. Then the network will create a new LAL={LA3, LA4, LA5}, where LA4 includes the critical cell (i.e. Cell 7).

In the SDF paging procedure in 4G LTE, when an incoming call arrives, the network first asks the last critical cell to page the MT. If the paging fails, the LA of the last critical cell is asked to page the MT. If the paging fails again, all cells in the LAL are asked to page the MT. For example, in part (a) of FIG. 10, the network first pages Cell 7, then the cells in LA4, and finally the cells in the new LAL={LA3, LA4, LA5}.

In the usual disclosed-based scheme and the disclosed scheme, there is not the notion of LAL, and a location update will be performed when an MT moves out of the old LA or receives an incoming call. Below, we only illustrate how the new LA in the two schemes is constructed due to boundary crossing. Note that a location update in 4G LTE and 3G will be performed only due to boundary crossing [17], [18].

Usual distance-based scheme: Assume the old LA={Cell 2, Cell 3, . . . , Cell 6} as shown in part (b) of FIG. 10. When the MT moves to Cell 7 from the old LA, the MT will perform a location update in Cell 7. Then the network will create a new LA={Cell 5, Cell 6, . . . , Cell 9}, where the center of the new LA is the critical cell (i.e. Cell 7).

Disclosed distance-based scheme: Assume the old LA={Cell 2, Cell 3, . . . , Cell 6} as shown part (c) of FIG. 10. When the MT moves to Cell 7 from the old LA, the MT will perform a location update in Cell 7. Then the network will create a new LA={Cell 6, Cell 7, . . . , Cell 12}, where the center of the new LA is Cell 9 (which is different from the critical cell, Cell 7). In the disclosed scheme, the center of the new LA might differ from the critical cell, while the center and the size of the new LA vary so as to adapt to the traffic and mobility patterns of each MT.

As shone in Table 3, we compare the 4G location management scheme, the usual scheme, and the disclosed scheme. From Table 3, we can see that the 4G location management scheme shares many essential characteristics with the distance-based scheme. For example, in the three schemes, the LA or LAL is assigned on a per-MT basis, and the boundary crossing will trigger a location update. Therefore, 4G location management scheme can be regarded a partial implementation of the distance-based scheme.

TABLE 3

Comparison of (a) the location management scheme in 4G LTE, (b) the usual distance-based scheme, and (c) the disclosed distance-based scheme.

| | Location management scheme in 4G LTE | Usual distance-based scheme | Disclosed scheme |
|---|---|---|---|
| Architecture | 3-level (cell/LA/LAL) | 2-level (cell/LA) | 2-level (cell/LA) |
| Center of LA or LAL | LA of critical cell | critical cell | may differ from critical cell |
| Per-MT | yes | yes | yes |
| Size of LA or LAL | static | dynamic | dynamic |
| Adaptation to traffic and mobility patterns | no | yes | yes |
| Optimization target | no | distance-threshold | distance-threshold initial-position offset |
| When to perform location update | boundary crossing (i.e. when the received LA identity is not in LAL) | boundary crossing call arrival | boundary crossing call arrival |
| Partition of sub-paging areas | SDF | symmetric with the center of LA | symmetric with the preferred direction |

G.2 Proof of Theorem 1

In the distance-based scheme, the location update is triggered by two possible events: (i) a boundary crossing due to the MT's movement, or (ii) a call arrival towards the MT. According to the location update mechanism, we now express $T=T(X, \Omega, \lambda, k)$.

Let $\tau \triangleq \tau(X, \Omega, k)$ denote the first exit time that the MT first hits or crosses the boundary $\partial\Omega$. Then $\tau(X, \Omega, k)$ is given by $$\tau(X,\Omega,k)=\inf\{t\geq 0: Y(0)=X \text{ and } Y(t)\notin \Omega\}. \quad (19)$$

Let $\zeta$ be the call arrival interval with parameter $\lambda$. Then, the mean location update interval is equal to the mean of the minimum of the call arrival interval and the first exit time, i.e.

$$T(X,\Omega,\lambda,k)=E(\min\{\zeta,\tau(X,\Omega,k)\}). \quad (20)$$

Since $\zeta$ is independent of $\tau$, we have $$T=E(\min(\tau,\zeta)) \quad (21)$$

$$=\int_0^\infty P(\min(\tau,\zeta)\geq t)dt=\int_0^\infty P(\tau\geq t)P(\zeta\geq t)dt$$

Let $G(X, t)=P(\tau(X, \Omega, k)\geq t)$ and $G^{\triangle} G(X, t)$. If $\zeta$ is an exponential random variable, (21) is rewritten as $$T=\int_0^\infty e^{-\lambda t}P(\tau\geq t)dt=\int_0^\infty e^{-\lambda t}G(X,t)dt \quad (22)$$

and we have $$\int_0^\infty e^{-\lambda t}\partial_1 G dt = -1+\lambda T \quad (23)$$

To set up the differential equation governing the mean location update interval T, we need to express the differential equation governing $G(X, t)$, the probability that the MT with initial position X is still in $\Omega$ at time t. To do so, we first point out that $G(X, t)$ satisfies an absorbing boundary condition. The reason is as follows. In the distance-based scheme, the diffusion process that the MT's movement follows can be regarded as a diffusion process with an absorption boundary, because if the MT hits or crosses the boundary $\partial\Omega$, a new LA will be formed, which means that the MT will disappear from its old LA, or the MT will be absorbed by $\partial\Omega$.

Then, according to the first exit-time theory [30], G is governed by the following backward equation with initial and boundary conditions.

$$\begin{cases} \partial_t G = \frac{1}{2}\sum_{ij}\sigma_{ij}\partial_{ij}G + \sum_j \mu_j \partial_j G, & X \in \Omega \\ G(X, t) = 0, & X \in \partial\Omega \\ G(X, 0) = 1 \text{ for } X \in \Omega \\ \quad\quad\quad = 0 \text{ for } X \in \partial\Omega \end{cases} \quad (24)$$

where $$\partial_t G = \frac{\partial G(X,t)}{\partial t}, \, \partial_{ij}G = \frac{\partial^2 G(X,t)}{\partial x_i \partial x_j}, \, \partial_j G = \frac{\partial G(X,t)}{\partial x_j}.$$

Multiplying both sides of the first and second equations in (24) by $e^{-\lambda t}$ and then integrating them over $(0,\infty)$ with respect to t, we obtain (7) after applying (22) and (23).

Remarks: If $\zeta$ is not an exponential random variable, we need to first calculate $G(X, t)$ through solving (24) and then substitute $G(X, t)$ into (21) to get the mean location update interval.

G.3 Proof of Theorem 2

When $\lambda \ll 1$, we substitute $\lambda$ with a value of $\lambda=0$ into (8). As is done in Section C.1.2), we can obtain approximate solutions of the mean location update interval as follows:

$$T = \begin{cases} (R^2 - x^2 - y^2)(A + B(x+y)), & \frac{\sigma_{11}}{2} > \max(\mu_1, \lambda) \\ C_1 + C_2 \exp\left(\frac{-2\mu_1 x}{\sigma_{11}}\right) - \frac{x}{\mu_1} + \frac{\sigma_{11}}{2\mu_1^2}, & \frac{\sigma_{11}}{2} \leq \max(\mu_1, \lambda) \end{cases} \quad (25)$$

where $A, B, C_1$, and $C_2$ are given each by $$\begin{cases} A = \frac{6(\sigma_{11} + \sigma_{22})}{(\mu_1 R)^2 + 6(\sigma_{11} + \sigma_{22})^2} \\ B = -\frac{\mu_1 A}{2(\sigma_{11} + \sigma_{22})} < 0 \\ C_1 = -C_2 \exp\left(\frac{-2\mu_1 R}{\sigma_{11}}\right) + \frac{R}{\mu_1} - \frac{\sigma_{11}}{2\mu_1^2} \\ C_2 = \frac{-1}{\left[\exp\left(\frac{2\mu_1 R}{\sigma_{11}}\right) - \exp\left(\frac{-2\mu_1 R}{\sigma_{11}}\right)\right]} \cdot \frac{2R}{\mu_1} < 0 \end{cases}.$$

Note that the drift $\mu_1$ is local, i.e. $\mu_1$ being a drift in terms of each displacement. To consider the cumulative effect of the drift, we define a global drift to be $\gamma=2\mu_1 R/\sigma_{11}$. From Corollary 1, when $k\to 0$, we have $\mu_1 \to 0$ so that $\gamma \to 0$. When $k \to \infty$, for the given $\xi$ and $\eta$, we have $$\gamma = \frac{2R}{E(\xi)} \bigg/ \left[\frac{\text{Var}(\xi)}{E^2(\xi)} + \frac{\text{Var}(\eta)}{E^2(\eta)}\right] \to \infty \text{ since } \frac{\text{Var}(\xi)}{E^2(\xi)} + \frac{\text{Var}(\eta)}{E^2(\eta)}$$

is a constant but $2R/E(\xi) \gg 1$ under Assumption A1. In short, under Assumption A1, we have $$\gamma = \begin{cases} 0, & k \to 0 \\ \infty, & k \to \infty \end{cases}. \quad (26)$$

Since $X=(x, 0)$, we substitute $y=0$ into (25) and take the second order derivative of T with respect to x. It is easy to show that $T_{xx}(x, R, \lambda, k)<0$, meaning that the solution x satisfying $T_x(x, R, \lambda, k)=0$ can maximize $T(x, R, \lambda, k)$. Let $x_{opt,R}$ denote the solution. We have that $$x_{opt,R} = \begin{cases} \frac{R\left(1 - \sqrt{1 + 3\left[\frac{\gamma\sigma_{11}}{4(\sigma_{11}+\sigma_{22})}\right]^2}\right)}{\frac{3\gamma\sigma_{11}}{4(\sigma_{11}+\sigma_{22})}}, & \frac{\sigma_{11}}{2} > \max(\mu_1, \lambda) \\ \frac{-R}{\gamma}\ln\left[\frac{\exp(\gamma)-\exp(-\gamma)}{2\gamma}\right], & \frac{\sigma_{11}}{2} \leq \max(\mu_1, \lambda) \end{cases} \quad (27)$$

$$\sim \begin{cases} -\frac{3\gamma\sigma_{11}R}{8(\sigma_{11}+\sigma_{22})}, & k \to 0 \\ -R\left[1 - \frac{\ln(2\gamma)}{\gamma}\right], & k \to \infty \end{cases}$$

$$\to \begin{cases} 0, & k \to 0 \\ -R, & k \to \infty \end{cases}$$

where $\sim$ denotes same order.

Letting $y=0$ and substituting the first equality of (27) into (25), we have $$T \to \begin{cases} \frac{R^2[48(\sigma_{11}+\sigma_{22})^2 + 9(\gamma\sigma_{11})^2]}{48(\sigma_{11}+\sigma_{22})^3}, & k \to 0 \\ 2R/\mu_1, & k \to \infty \end{cases} \quad (28)$$

$$\to \begin{cases} R^2/(\sigma_{11}+\sigma_{22}), & k \to 0 \\ 2R/\mu_1, & k \to \infty \end{cases}.$$

Substituting the last first expression of (28) into (14), we have that $$C_{total}(x_{opt,R}, R, \lambda, k) = \frac{U}{T(x_{opt,R}, R, \lambda, k)} + \lambda\pi R^2 V \quad (29)$$

$$\to \begin{cases} \frac{U(\sigma_{11}+\sigma_{22})}{R^2} + \lambda\pi R^2 V, & k \to 0 \\ \frac{U\mu_1}{2R} + \lambda\pi R^2 V, & k \to \infty \end{cases} \geq$$

$$\begin{cases} 2\sqrt{(\sigma_{11}+\sigma_{22})\lambda U V \pi}, & k \to 0 \\ \sqrt[3]{(U\mu_1)^2 \lambda V \pi/16}, & k \to \infty \end{cases}.$$

Equality of the last expression of (29) holds as the total cost $C_{total}(.)$ is minimized. Then we have $$R_{opt} \approx \begin{cases} \sqrt[4]{(\sigma_{11}+\sigma_{22})U/(\lambda V \pi)}, & k \to 0 \\ \sqrt[3]{U\mu_1/(4\lambda V \pi)}, & k \to \infty \end{cases}. \quad (30)$$

G.4 Significance of the Present Work Over Previous Works in the Art

In previous studies [6]-[18], which are most relevant to the present work, there are two aspects. The two aspects are that (i) they did not consider the higher-granularity movement characteristics (such as road-section-based movement), and (ii) they did not integrate mobility patterns (such as mobility directionality) into the LA design. The present work considers these two aspects. The significance of the present work is summarized as follows.

The present work adopts the two-dimensional CTRW mobility model [27] to capture the practical and fundamental fine-granularity mobility characteristics of an MT (such as road-section-based movement, non-Markovian displacement time and movement directionality).

In the present work, it is proposed an LCO location management scheme that integrates the mobility characteristics into the LA design.

In the present LCO, the location update scheme makes use of an optimal LA center in addition to an optimal LA size.

In the present LCO, the terminal-paging scheme partitions the LA of an MT into sub-paging areas that are symmetric with respect to the diameter aligned with the preferred direction of the MT.

In the present work, it is proposed an analytical framework to evaluate the LCO scheme under the CTRW movement model. Simulations were also run to verify the accuracy of the analytical framework. This framework allows us to quantify the improvement of the LCO scheme over conventional schemes. For example, for the case of circular LA and low Poisson call-arrival rate, in the optimal LA design, we have shown that by comparing the optimal-LA-centered and conventional initial-position-centered solutions, when the movement directionality is strong (i.e. the bias for specific directions being strong), the optimal LA size in the latter is about $\sqrt[3]{2}$ ($\approx$1.260) times more than that of the former, and the minimum total cost incurred by the latter is about $\sqrt[3]{4}$ ($\approx$1.587) times more than that of the former. That is, the LA center optimization, which the previous works [6]-[18] have not considered, has the potential of reducing the cost by 37%.

INDUSTRIAL APPLICABIITY

First of all, the present invention can be implemented in mobile communication networks. For example, the location management in 4G LTE can be regarded as a partial implementation of the distance-based scheme. The present invention can be used to further reduce the 4G location management cost by considering the mobility characteristic of each MT.

Furthermore, the present invention can also be used in emerging IP-based mobile networks. For example, [21] has proposed a group location management scheme in machine-to-machine mobile networks, where machines are grouped based on the similarity of their mobility patterns and only the leader machine performs location management on behalf of the other machines in the same group. One scenario is a package tracking system, where all the tracking machines attached on the packages in the same vehicle are highly correlated in terms of time and space and hence have similar mobility patterns. Applying the present invention to this scenario can further reduce the group signal cost by capturing the mobile behavior of the leader machine.

What is claimed is:

1. A method for updating a location of a mobile terminal (MT) for a mobile communication network when the MT crosses a boundary of a first location-update area (LA) assigned to the MT, an initial position of the MT being regarded as a location where the MT performed a latest location update at the first LA before crossing the boundary, the method comprising:
   determining, by one or more computer processors in the mobile communication network, a second LA to be assigned to the MT for replacing the first LA, the second LA being characterized by a LA center and a LA size, wherein the LA center and the LA size are determined by numerically optimizing the LA center and the LA size in a sense that a mean total location-management cost predicted for the LA center and the LA size is minimized without restricting the LA center to be fixed at the initial position;
   wherein the LA center is located at a distance $x_{opt}$ from the initial position in a preferred movement direction of the MT;
   wherein the LA size is determinable by a LA radius, denoted as $R_{opt}$; and
   wherein the optimizing of the LA center and the LA size comprises determining $x_{opt}$ and $R_{opt}$, the determining of $x_{opt}$ and $R_{opt}$ comprising the steps of:
   (1) generating a plurality of candidate LA-radius values;
   (2) for an individual candidate LA-radius value, denoted as R, determining a corresponding distance $x_{opt,R}$ that minimizes the mean total location-management cost conditioned on R;
   (3) repeating the step (2) for all the candidate LA-radius values to thereby obtain plural tuples of (R, $xo_{pt,R}$, $C_{total}|R,x_{opt,R}$) where $C_{total}|R,x_{opt,R}$ is a value of the mean total location-management cost computed for R and $x_{opt,R}$; and
   (4) identifying an optimal candidate pair among the plural candidate pairs such that the optimal candidate pair has the lowest value of $C_{total}|R,x_{opt,R}$ among the plural candidate pairs, whereby the values of R and $x_{opt,R}$ of the optimal candidate pair are $R_{opt}$ and $x_{opt}$, respectively.

2. The method of claim 1, wherein the mean total location-management cost is given by a sum of a mean location-update cost and mean terminal-paging cost.

3. The method of claim 1, wherein in the step (2), $x_{opt,R}$ is obtained from R by using a single-variable optimization algorithm.

4. The method of claim 1, wherein the mobile communication network is a 4G LTE system or any IP-based mobile network.

5. A method for managing a location of a mobile terminal (MT) for a mobile communication network, comprising:
   a first process according to the method of claim 1, for updating the location of the MT when the MT crosses a boundary of a first location-update area (LA) assigned to the MT; and
   a second process of partitioning the second LA into a plurality of sub-paging areas for allowing the mobile communication network to select one or more such sub-paging areas to page the MT when a call arrives at the network.

6. The method of claim 5, wherein the second process comprises dividing the second LA in a pie-like manner to yield a pre-determined number of sub-paging areas with a common vertex selected to be the initial position and with substantially-similar interior angles measured at the common vertex.

7. The method of claim 5, wherein the second process comprises dividing the second LA in a pie-like manner to yield a pre-determined number of sub-paging areas with a common vertex selected to be the initial position and with substantially-similar arc lengths.

8. The method of claim 5, wherein the second process comprises dividing the second LA into a pre-determined number of ring-shaped segments so that each of the ring-shaped segments is one of the sub-paging areas.

9. A method for updating a location of a mobile terminal (MT) for a mobile communication network when the MT crosses a boundary of a first location-update area (LA) assigned to the MT, an initial position of the MT being regarded as a location where the MT performed a latest location update at the first LA before crossing the boundary, the method comprising:
   determining, by one or more computer processors in the mobile communication network, a second LA to be assigned to the MT for replacing the first LA, the second LA being characterized by a LA center and a LA size, wherein the LA center and the LA size are determined by numerically optimizing the LA center and the LA size in a sense that a mean total location-management cost predicted for the LA center and the LA size is minimized without restricting the LA center to be fixed at the initial position;

wherein the LA center is located at a distance $x_{opt}$ from the initial position in a preferred movement direction of the MT;

wherein the LA size is determinable by a LA radius, denoted as $R_{opt}$; and wherein the optimizing of the LA center and the LA size comprises computing $x_{opt}$ and $R_{opt}$ by $$\begin{cases} R_{opt} = \begin{cases} R_0, & \text{if } \Delta_R(R_1, \lambda, k) > 0 \\ \max\{R_j : \Delta_R(R_j, \lambda, k) \leq 0\}, & \text{otherwise} \end{cases} \\ x_{opt} = g(R_{opt}) \end{cases}$$

where:
(a) $R_0$ is a pre-determined initial candidate LA-radius value;
(b) $R_j$, j a positive integer, is the jth candidate LA-radius value given by $R_j = R_{j-1} + R_{step}$;
(c) $R_{step}$ is a pre-determined step size;
(d) $\Delta_R(R_j,\lambda,k)$ is computed by $\Delta_R(R_j,\lambda,k) = C_{total}(g(R_j),R_j,\lambda,k) - C_{total}(g(R_{j-1}),R_{j-1},\lambda,k)$;
(e) $g(.)$ is a function such that for $x_{opt,R} = g(R)$ where R is any candidate LA-radius value, $g(R)$ gives a corresponding distance $x_{opt,R}$ that minimizes the mean total location-management cost conditioned on R;
(f) $C_{total}(.)$ is a function for computing the mean total location-management cost;
(g) $\lambda$ is a call arrival rate for characterizing a call arrival process; and
(h) k is the preferred movement direction.

10. The method of claim 9, wherein $g(.)$ is given by $$x_{opt,R} = g(R) = \left(\frac{1}{\lambda_2 - \lambda_1}\right)\ln\left(-\frac{C_1\lambda_1}{C_2\lambda_2}\right)$$

where:
$\lambda_1$ and $\lambda_2$ are given by $$\lambda_1 = \frac{-\mu_1 - \sqrt{\mu_1^2 + 2\lambda\sigma_{11}}}{\sigma_{11}}$$

and $$\lambda_2 = \frac{-\mu_1 + \sqrt{\mu_1^2 + 2\lambda\sigma_{11}}}{\sigma_{11}},$$

respectively, in which $\vec{\mu} = (\mu_1, \mu_2)$ and $$\vec{\sigma} = \begin{pmatrix} \sigma_{11} & \sigma_{12} \\ \sigma_{21} & \sigma_{22} \end{pmatrix}$$

are respectively a drift vector and a diffusion coefficient matrix of a time-homogeneous diffusion process used for modeling the MT's movement; and $C_2$ and $C_1$ are given by $$C_2 = -\frac{1}{\lambda}\frac{1}{C_0 e^{\lambda_1 R} + e^{\lambda_2 R}}$$

and $$C_1 = -C_0 C_2,$$

respectively, in which $$C_0 = -\frac{e^{\lambda_2 R} - e^{-\lambda_2 R}}{e^{\lambda_1 R} - e^{-\lambda_1 R}}.$$

11. A mobile communication network comprising one or more computer processors configured to execute a process according to the method of claim 9.

12. A method for managing a location of a mobile terminal (MT) for a mobile communication network, comprising:
a first process according to the method of claim 9, for updating the location of the MT when the MT crosses a boundary of a first location-update area (LA) assigned to the MT; and
a second process of partitioning the second LA into a plurality of sub-paging areas for allowing the mobile communication network to select one or more such sub-paging areas to page the MT when a call arrives at the network.

13. The method of claim 12, wherein the second process comprises dividing the second LA in a pie-like manner to yield a pre-determined number of sub-paging areas with a common vertex selected to be the initial position and with substantially-similar interior angles measured at the common vertex.

14. The method of claim 12, wherein the second process comprises dividing the second LA in a pie-like manner to yield a pre-determined number of sub-paging areas with a common vertex selected to be the initial position and with substantially-similar arc lengths.

15. The method of claim 12, wherein the second process comprises dividing the second LA into a pre-determined number of ring-shaped segments so that each of the ring-shaped segments is one of the sub-paging areas.

16. A method for updating a location of a mobile terminal (MT) for a mobile communication network when the MT crosses a boundary of a first location-update area (LA) assigned to the MT, an initial position of the MT being regarded as a location where the MT performed a latest location update at the first LA before crossing the boundary, the method comprising:
determining, by one or more computer processors in the mobile communication network, a second LA to be assigned to the MT for replacing the first LA, the second LA being characterized by a LA center and a LA size, wherein the LA center and the LA size are determined by numerically optimizing the LA center and the LA size in a sense that a mean total location-management cost predicted for the LA center and the LA size is minimized without restricting the LA center to be fixed at the initial position;

wherein the LA center is located at a distance $x_{opt}$ from the initial position in a preferred movement direction of the MT;

wherein the LA size is determinable by a LA radius, denoted as $R_{opt}$; and wherein the optimizing of the LA center and the LA size comprises computing $x_{opt}$ and $R_{opt}$ by $$R_{opt} = \{\text{fourth root}\}\overline{(\sigma_{11}+\sigma_{22})U/(\lambda V\pi)}$$

and $$x_{opt} = 0$$

where:
(a) U is a cost of performing a location update;
(b) V is a cost of paging a cell;
(c) $\lambda$ is a call arrival rate for characterizing a call arrival process; and
(d) $\sigma_{11}$ and $\sigma_{22}$ are two coefficients of a diffusion coefficient matrix, $$\vec{\sigma} = \begin{pmatrix} \sigma_{11} & \sigma_{12} \\ \sigma_{21} & \sigma_{22} \end{pmatrix},$$

of a time-homogeneous diffusion process used for modeling the MT's movement.

17. A method for managing a location of a mobile terminal (MT) for a mobile communication network, comprising:
a first process according to the method of claim 16, for updating the location of the MT when the MT crosses a boundary of a first location-update area (LA) assigned to the MT; and
a second process of partitioning the second LA into a plurality of sub-paging areas for allowing the mobile communication network to select one or more such sub-paging areas to page the MT when a call arrives at the network.

18. A method for updating a location of a mobile terminal (MT) for a mobile communication network when the MT crosses a boundary of a first location-update area (LA) assigned to the MT, an initial position of the MT being regarded as a location where the MT performed a latest location update at the first LA before crossing the boundary, the method comprising:

determining, by one or more computer processors in the mobile communication network, a second LA to be assigned to the MT for replacing the first LA, the second LA being characterized by a LA center and a LA size, wherein the LA center and the LA size are determined by numerically optimizing the LA center and the LA size in a sense that a mean total location-management cost predicted for the LA center and the LA size is minimized without restricting the LA center to be fixed at the initial position;

wherein the LA center is located at a distance $x_{opt}$ from the initial position in a preferred movement direction of the MT;

wherein the LA size is determinable by a LA radius, denoted as $R_{opt}$; and wherein the optimizing of the LA center and the LA size comprises computing $x_{opt}$ and $R_{opt}$ by $$R_{opt} = \sqrt[3]{U\mu_1/(4\lambda V\pi)}$$

and $$x_{opt} = -R_{opt}$$

where:
(a) U is a cost of performing a location update;
(b) V is a cost of paging a cell;
(c) $\lambda$ is a call arrival rate for characterizing a call arrival process; and
(d) $\mu_1$ is a coefficient of a drift vector, $\vec{\mu} = (\mu_1, \mu_2)$, of a time-homogeneous diffusion process used for modeling the MT's movement.

19. A method for managing a location of a mobile terminal (MT) for a mobile communication network, comprising:
a first process according to the method of claim 18, for updating the location of the MT when the MT crosses a boundary of a first location-update area (LA) assigned to the MT; and
a second process of partitioning the second LA into a plurality of sub-paging areas for allowing the mobile communication network to select one or more such sub-paging areas to page the MT when a call arrives at the network.

* * * * *